(12) United States Patent
Berg et al.

(10) Patent No.: US 8,567,546 B2
(45) Date of Patent: Oct. 29, 2013

(54) VEHICLE COOLING SYSTEM

(75) Inventors: Jeffrey J Berg, Warroad, MN (US); Troy A Pierce, Roseau, MN (US)

(73) Assignee: Polaris Industries Inc., Medina, MN (US)

( * ) Notice: Subject to any disclaimer, the term of this patent is extended or adjusted under 35 U.S.C. 154(b) by 67 days.

(21) Appl. No.: 13/018,824

(22) Filed: Feb. 1, 2011

(65) Prior Publication Data

US 2011/0186371 A1 Aug. 4, 2011

Related U.S. Application Data

(60) Provisional application No. 61/337,239, filed on Feb. 1, 2010.

(51) Int. Cl.
*B62K 11/02* (2006.01)

(52) U.S. Cl.
USPC .......................................... 180/190

(58) Field of Classification Search
USPC .................. 180/190, 68.4; 123/41.1
See application file for complete search history.

(56) References Cited

U.S. PATENT DOCUMENTS

| | | | |
|---|---|---|---|
| 1,784,766 A | 12/1930 | Stranahan | |
| 2,078,067 A | 4/1937 | Duesenberg | |
| 3,763,953 A | 10/1973 | Yoda | |
| 3,835,948 A | 9/1974 | Ducio | |
| 3,901,335 A | 8/1975 | Johnson | |
| 4,657,074 A | 4/1987 | Tomita et al. | |
| 4,828,017 A | 5/1989 | Watanabe et al. | |
| 5,113,819 A | 5/1992 | Murakawa et al. | |
| 5,129,473 A | 7/1992 | Boyer | |
| 5,232,066 A | 8/1993 | Schnelker | |
| 5,251,718 A | 10/1993 | Inagawa et al. | |
| 5,316,079 A | 5/1994 | Hedeen | |
| 5,490,574 A | 2/1996 | Ishiizumi et al. | |
| 5,568,840 A | 10/1996 | Nagata et al. | |
| 5,957,230 A | 9/1999 | Harano et al. | |
| 6,109,217 A | 8/2000 | Hedlund et al. | |
| 6,681,724 B1 * | 1/2004 | Berg | 123/41.1 |
| 6,691,815 B2 | 2/2004 | Rioux et al. | |
| 6,749,036 B1 | 6/2004 | Schrapp et al. | |
| 6,823,957 B2 | 11/2004 | Girouard et al. | |
| 6,892,844 B2 | 5/2005 | Atsuumi | |
| 6,971,438 B2 | 12/2005 | Oki et al. | |
| 7,055,454 B1 | 6/2006 | Whiting | |
| 7,089,994 B2 | 8/2006 | Esposito et al. | |
| 7,188,696 B2 | 3/2007 | Arnold | |
| 7,213,542 B2 | 5/2007 | Oshima et al. | |

(Continued)

FOREIGN PATENT DOCUMENTS

WO WO 2009/114414 9/2009

OTHER PUBLICATIONS

European Patent Office, International Search Report for PCT/US2010/003206, Mar. 15, 2011, 6 pages.

(Continued)

*Primary Examiner* — Tony Winner
(74) *Attorney, Agent, or Firm* — Faegre Baker Daniels LLP

(57) ABSTRACT

A vehicle is shown such as a snowmobile, where a frame includes a cooling system operating therein having a plurality of heat exchangers. The cooling system may comprise a front radiator, a front tunnel cooler, a top tunnel cooler, and a rear cooler mounted rearwardly of the tunnel.

17 Claims, 28 Drawing Sheets

(56) References Cited

U.S. PATENT DOCUMENTS

| | | |
|---|---|---|
| 7,213,638 B2 | 5/2007 | Seiler et al. |
| 7,353,898 B1 | 4/2008 | Bates, Jr. |
| 7,533,749 B1 | 5/2009 | Sampson et al. |
| 7,591,332 B1 | 9/2009 | Bates, Jr. |
| 7,779,944 B2 | 8/2010 | Bergman |
| 2004/0182624 A1 | 9/2004 | Yatagai et al. |
| 2005/0284677 A1 | 12/2005 | Arnold |
| 2007/0175687 A1* | 8/2007 | Yatagai et al. ............ 180/190 |
| 2007/0193715 A1* | 8/2007 | Bergman et al. ............ 165/41 |
| 2007/0199753 A1 | 8/2007 | Giese |
| 2007/0221424 A1 | 9/2007 | Giese |
| 2007/0246283 A1 | 10/2007 | Giese |
| 2011/0139529 A1* | 6/2011 | Eichenberger et al. ....... 180/190 |

OTHER PUBLICATIONS

European Patent Office, Written Opinion for PCT/US2010/003206, Mar. 15, 2011, 5 pages.

* cited by examiner

VEHICLE COOLING SYSTEM

This application claims priority to U.S. Provisional patent application Ser. No. 61/337,239 filed Feb. 1, 2010, the subject matter of which is incorporated herein by reference.

BACKGROUND

The present invention relates to various systems for snowmobiles, particularly an engine cooling system.

This application incorporates the subject matter of Applicants Ser. No. 61/104,436 filed on Oct. 10, 2008 herein.

Performance characteristics of snowmobiles depend on a variety of systems and components, including the engine cooling system. Typically, a snowmobile includes a radiator towards a front of the vehicle to receive air flow there across as in many vehicles. It is also known to have cooling systems located as a part of the tunnel, see our U.S. Pat. Nos. 6,681,724; 7,353,898 and 7,533,749, the subject matter of which is incorporated herein by reference. The system requirements for cooling increase as engine sizes and horsepower output increases. U.S. Pat. No. 7,779,944 shows a rear molded member extending from the snowmobile tunnel, and a rear heat exchanger mounted within rear molded member.

SUMMARY

In one embodiment, a snowmobile has a frame, a water cooled engine supported by the frame and a ground engaging drive system for propelling the snowmobile, the snowmobile has a rear heat exchanger coupled to the engine for cooling engine water, and the heat exchanger is movable relative to the frame, and is fluidly coupled by flexible couplings.

In another embodiment, a snowmobile has a frame, a water cooled engine supported by the frame and a ground engaging drive system for propelling the snowmobile, the snowmobile has a rear heat exchanger supported by a rear portion of the frame and is coupled to the engine for cooling engine water, a second heat exchanger is coupled to the frame and is fluidly coupled to the rear heat exchanger.

BRIEF DESCRIPTION OF THE DRAWINGS

Corresponding reference characters indicate corresponding parts throughout the several views. Unless stated otherwise the drawings are proportional with the exception of the flowcharts and block representations.

DETAILED DESCRIPTION

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a snowmobile, it should be understood that the features disclosed herein may have application to other types of vehicles such as all-terrain vehicles, motorcycles, watercraft, utility vehicles, and golf carts.

Figure 1:
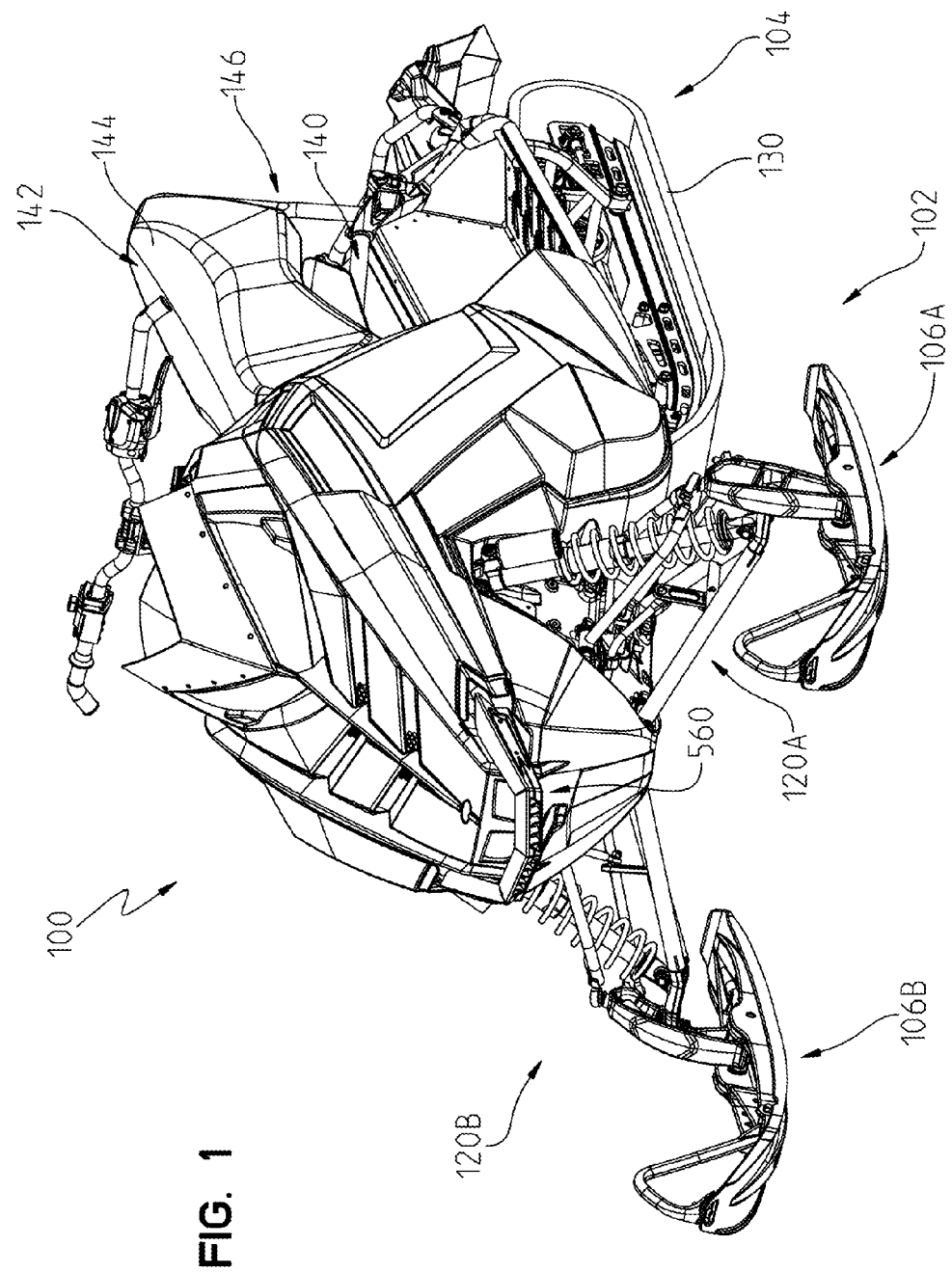
FIG. 1 illustrates a front, left, perspective view of an exemplary snowmobile.
Figure 2:
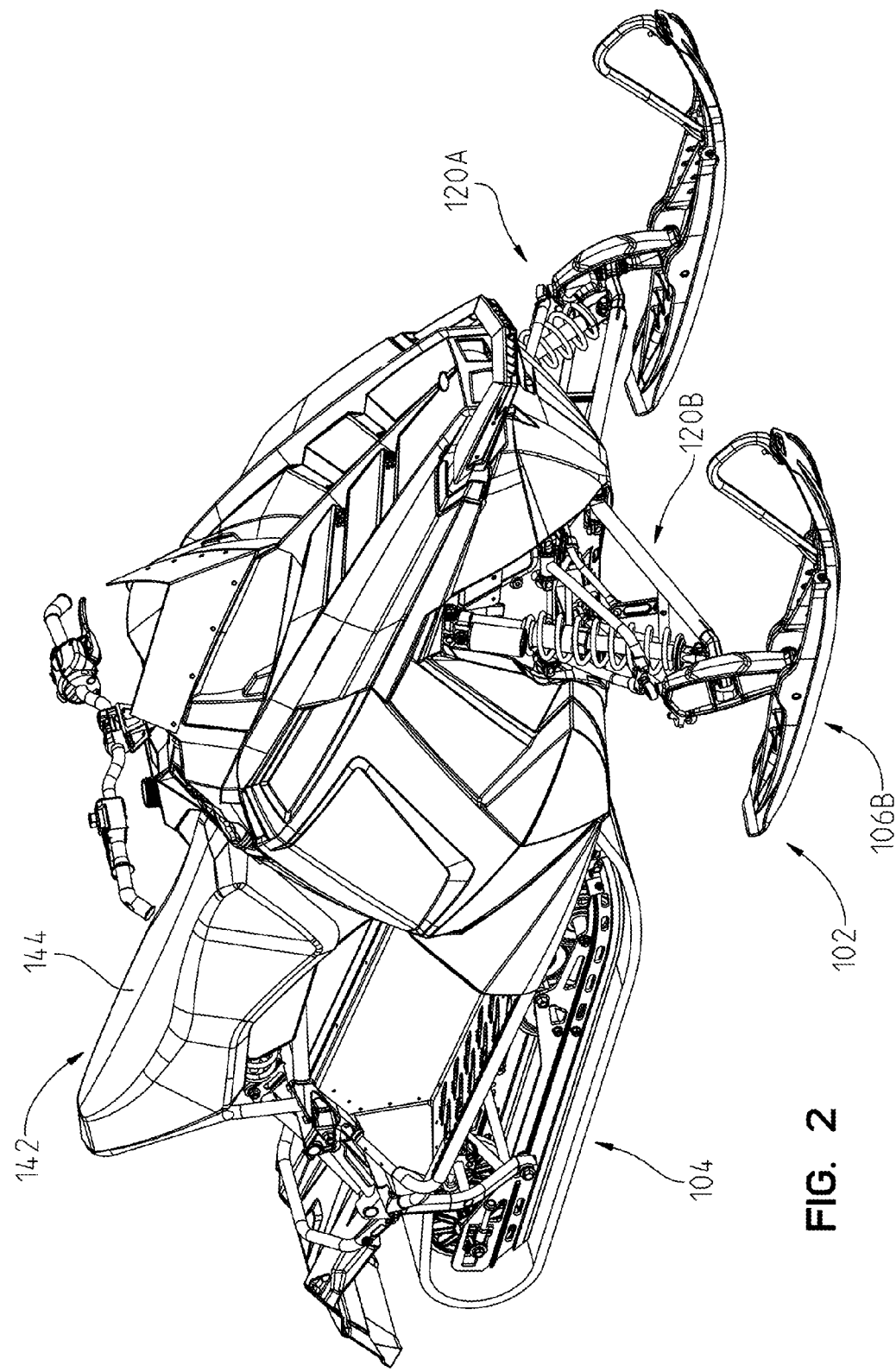
FIG. 2 illustrates a front, right, perspective view of the exemplary utility vehicle of FIG. 1.

Referring to FIGS. 1 and 2, an illustrated embodiment of vehicle 100 is shown. The illustrated vehicle 100 is a snowmobile. However, the following disclosure is applicable to other types of vehicles such as all terrain vehicles, motorcycles, watercraft, utility vehicles, and golf carts. Vehicle 100 as illustrated includes a plurality of ground engaging members 102. Illustratively, ground engaging members 102 include an endless track assembly 104 and a pair of front skis 106a and 106b. Endless track assembly 104 supports a rear portion of vehicle 100 while skis 106 support a front portion of vehicle 100. Further, endless track assembly 104 is operatively coupled to an engine 108 (see FIG. 6).

Figure 10:
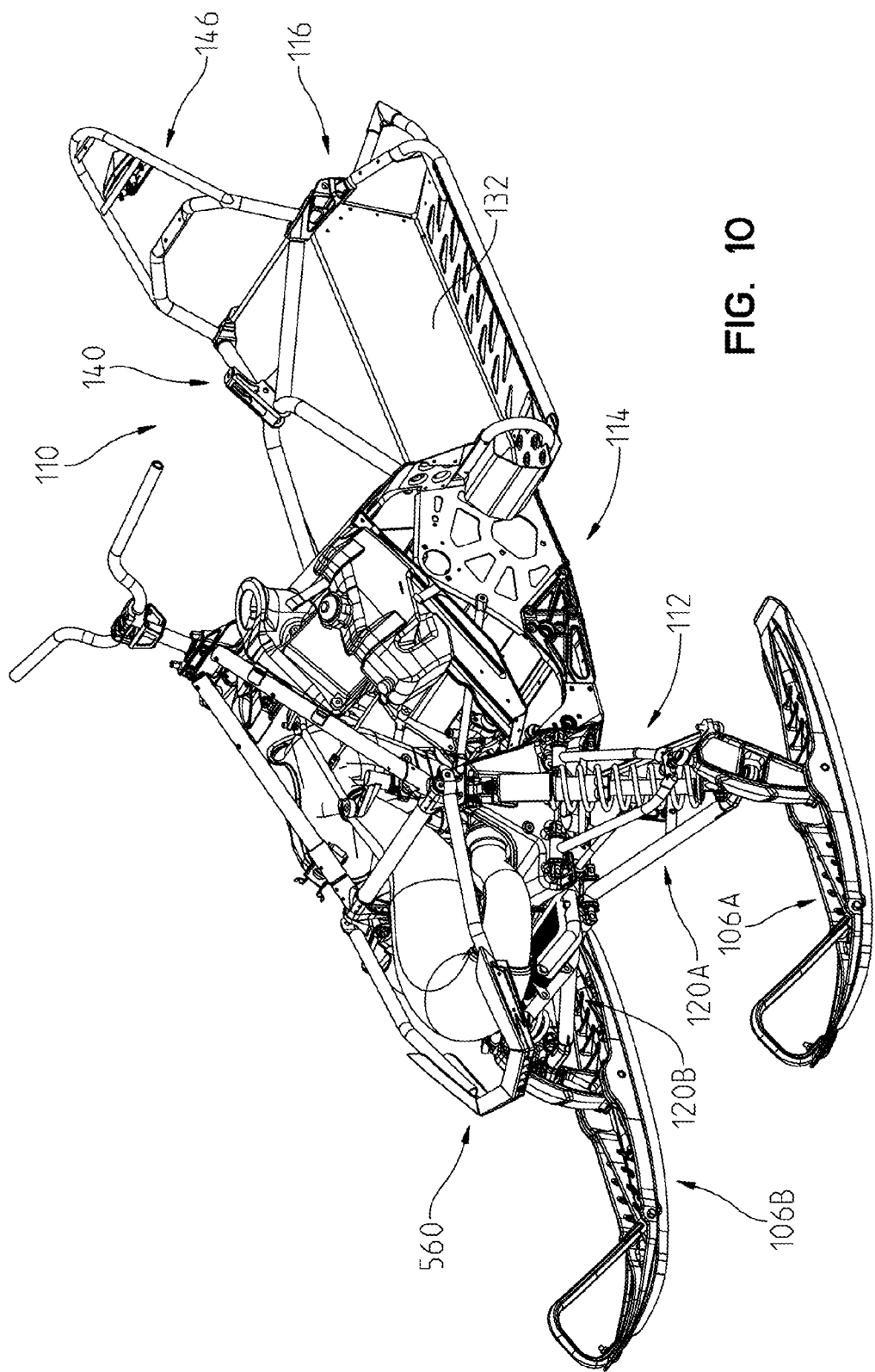
FIG. 10 illustrates a perspective view of a frame of the exemplary snowmobile of FIG. 1 along with several components supported by the frame.

Referring to FIG. 10, vehicle 100 includes a frame 110. Frame 110 includes a front frame portion 112 which is generally supported by skis 106. Frame 110 further includes a middle frame portion 114 which generally supports engine 108. Frame 110 further includes a rear portion 116 which is generally supported by endless track assembly 104. Front frame portion 112 is coupled to skis 106A and 106B through respective front suspensions 120A and 120B. Front suspensions 120A and 120B permits the relative movement of frame 110 relative to skis 106. In general, front suspension 120B is a mirror image of front suspension 120A.

Figure 3:
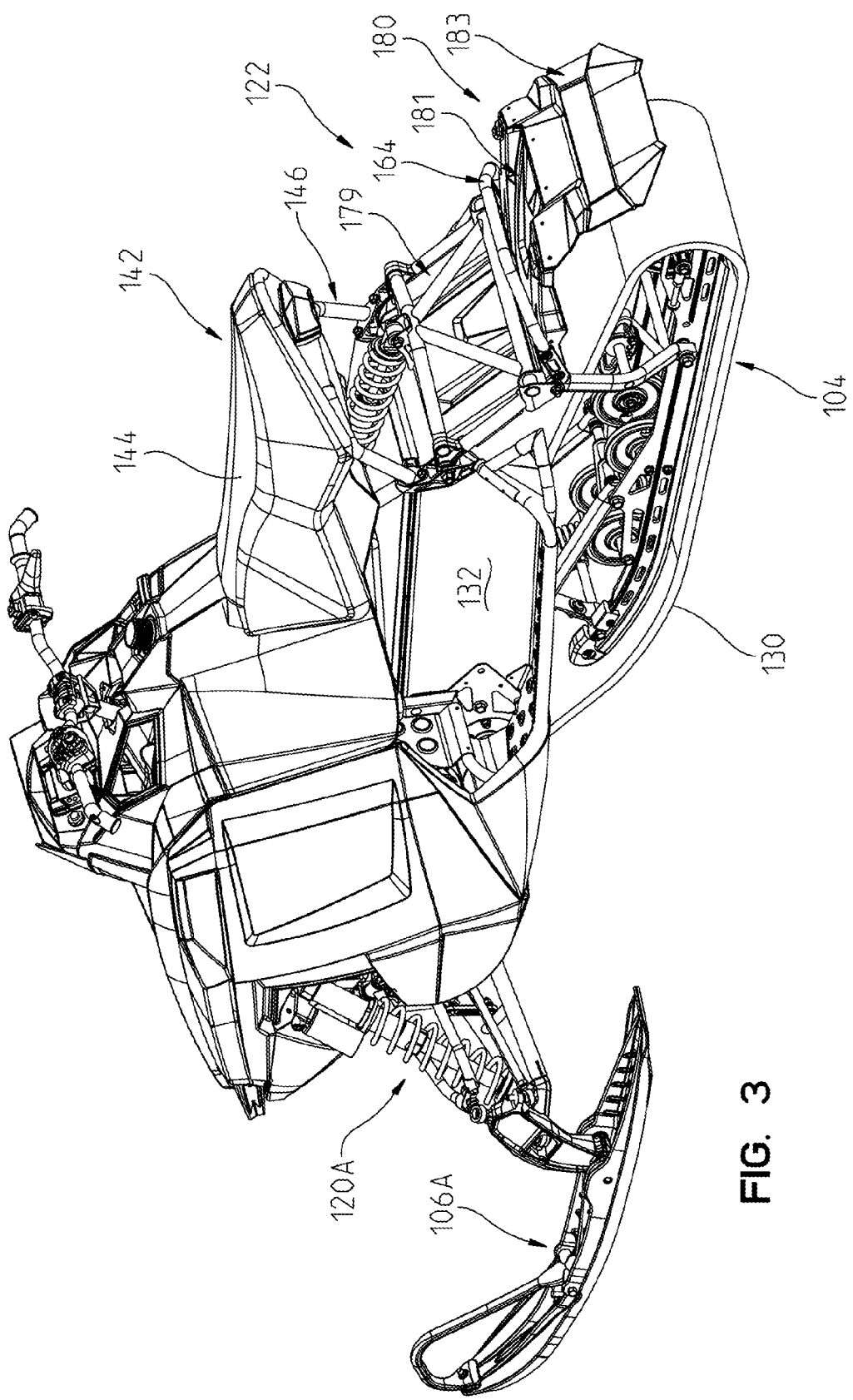
FIG. 3 illustrates a rear, left, perspective view of the exemplary snowmobile of FIG. 1.
Figure 4:
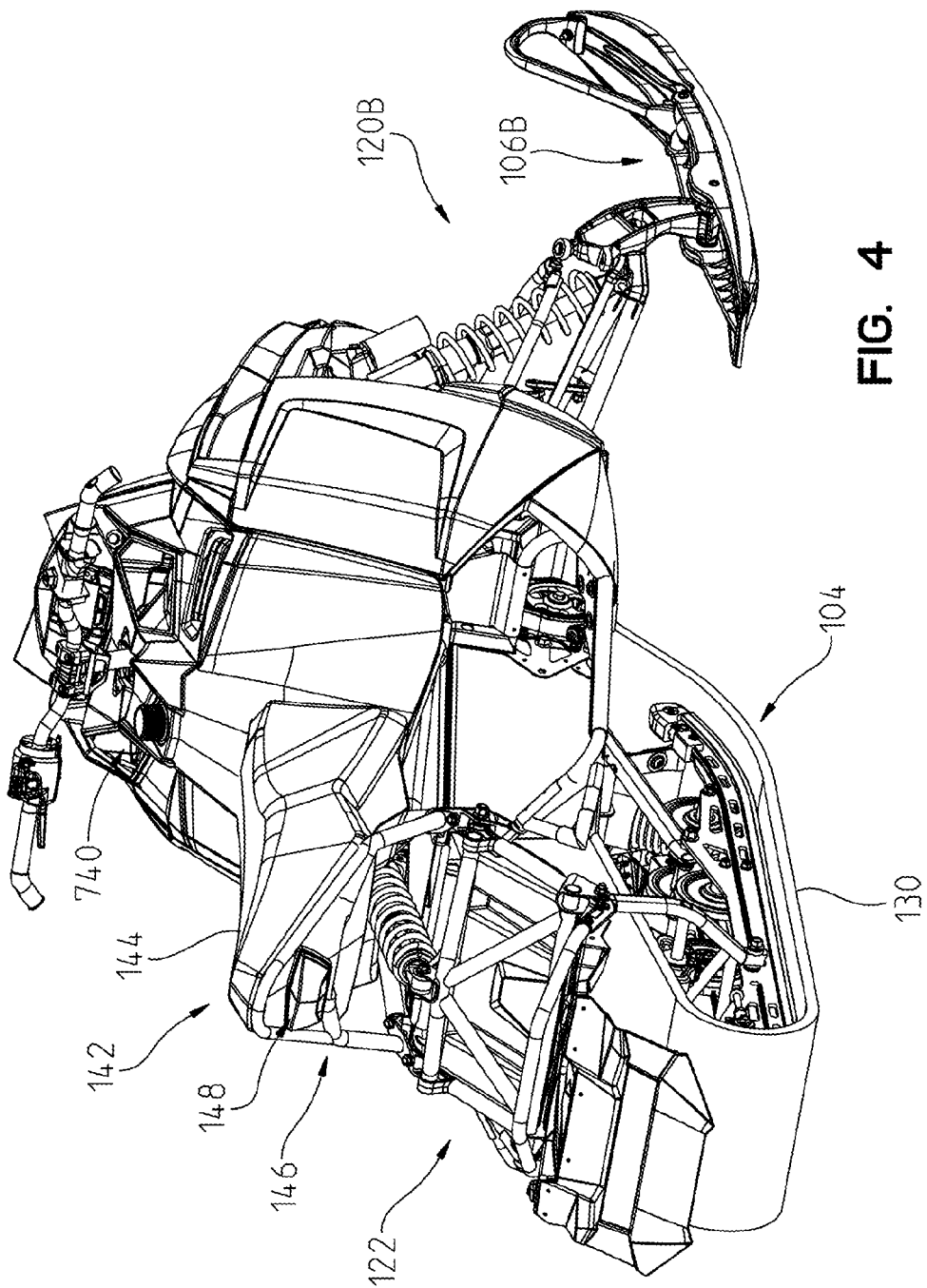
FIG. 4 illustrates a rear, right, perspective view of the exemplary snowmobile of FIG. 1.
Figure 8:
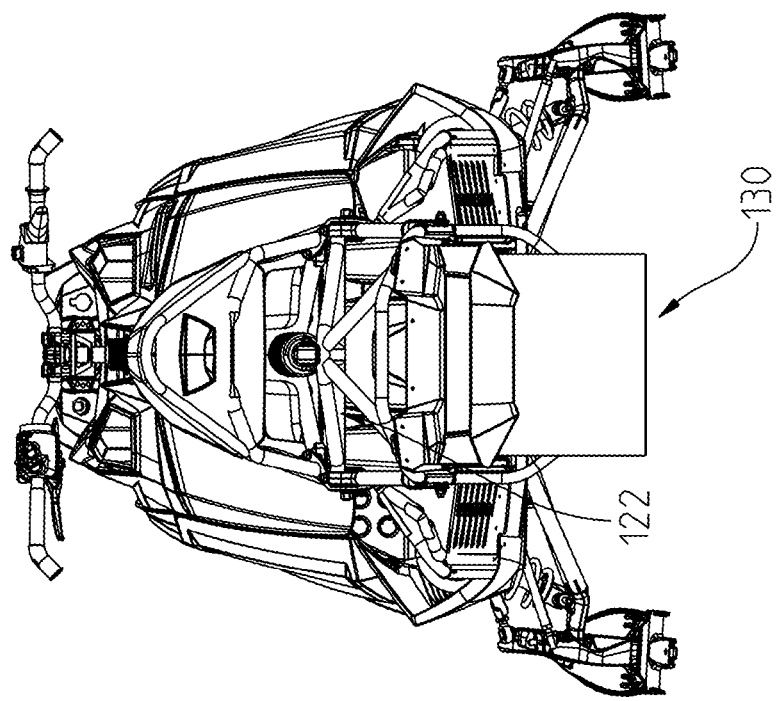
FIG. 8 illustrates a rear view of the exemplary snowmobile of FIG. 1.
Figure 5:
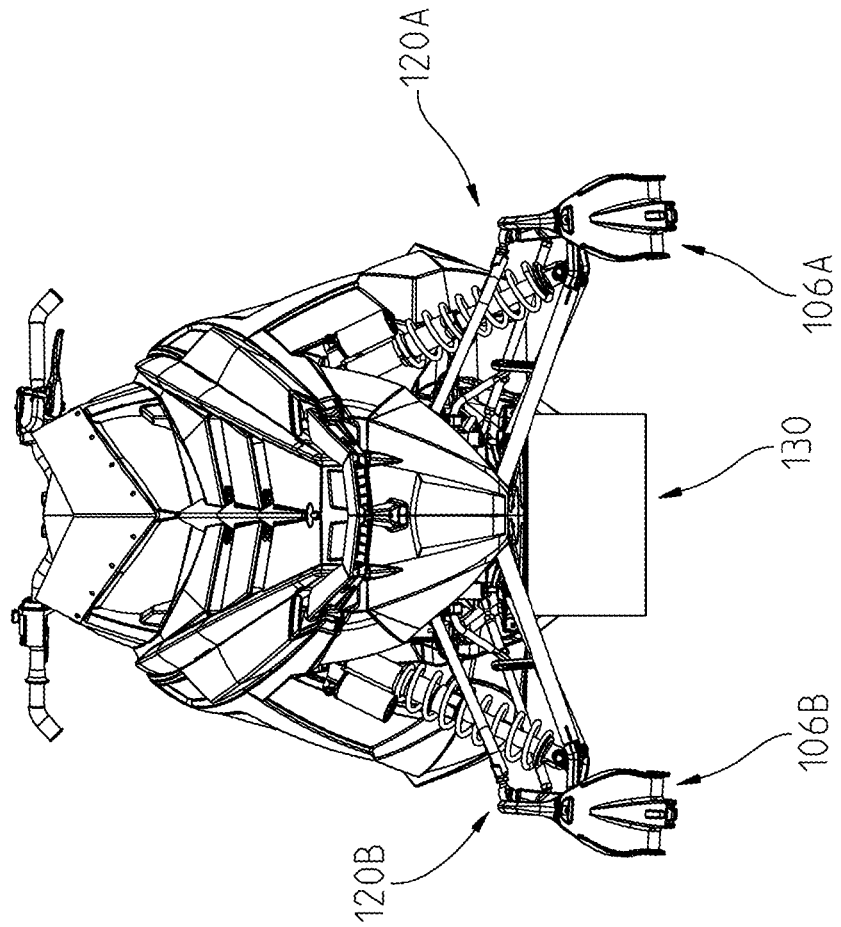
FIG. 5 illustrates a front view of the exemplary snowmobile of FIG. 1.

Referring to FIG. 3, frame 110 is supported by endless track assembly 104 through a rear suspension 122 and a drive shaft 124. Additional details regarding the structure and operation of rear suspension 122 and the connection between rear suspension 122 and frame 110 are provided in U.S. patent application Ser. No. 11/623,873, published under Publication No. 2007-0199753, filed Jan. 17, 2007, titled SNOWMOBILE FRAME ASSEMBLY; U.S. patent application Ser. No. 11/623,879, published under Publication No. 2007-0221424, filed Jan. 17, 2007, titled SNOWMOBILE REAR SUSPENSION; and U.S. patent application Ser. No. 11/710,177, published under Publication No. 2007-0246283, filed Feb. 23, 2007, titled SNOWMOBILE DRIVE ASSEMBLY, the disclosures of which are expressly incorporated by reference herein.

Figure 6:
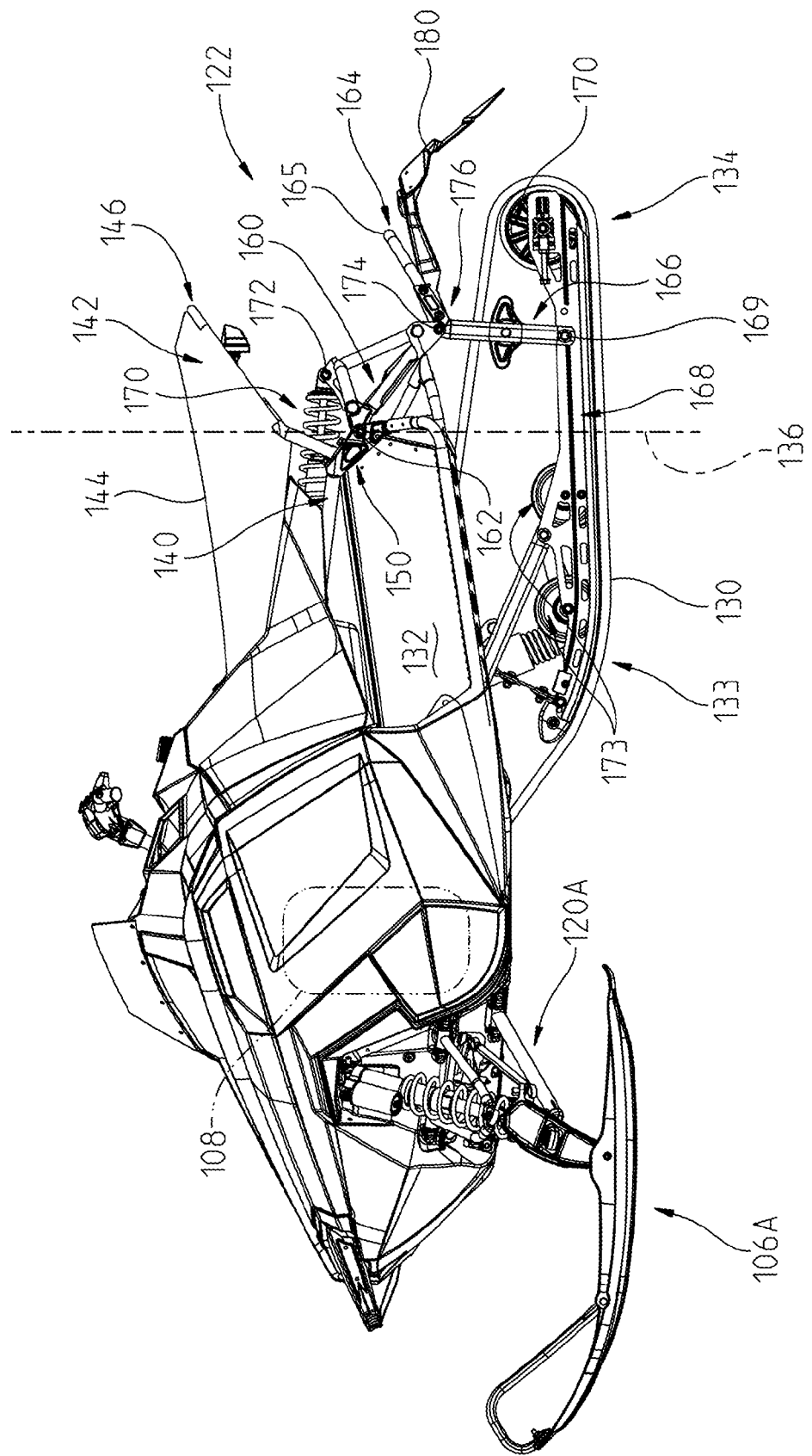
FIG. 6 illustrates a left side view of the exemplary snowmobile of FIG. 1.
Figure 7:
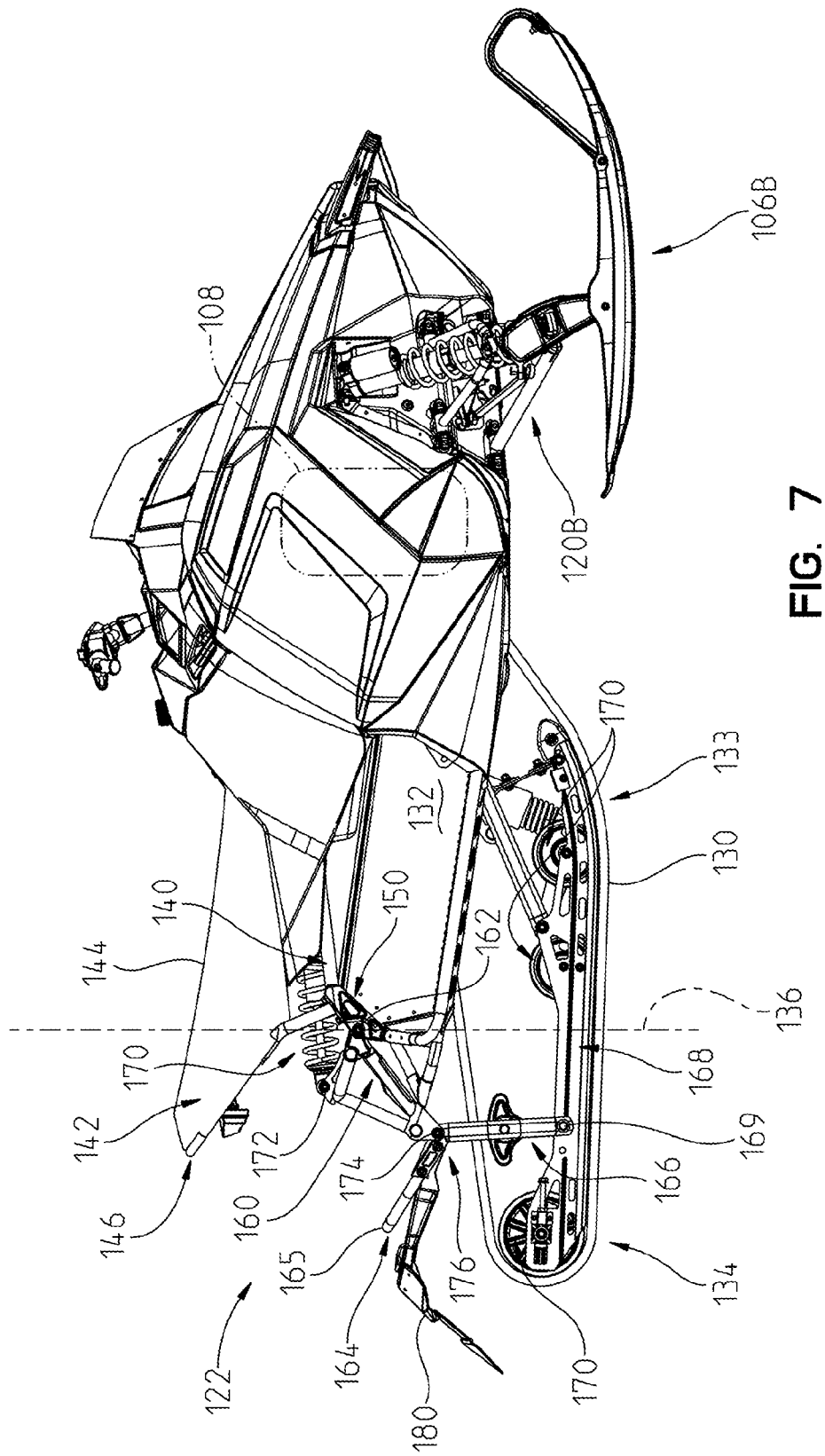
FIG. 7 illustrates a right side view of the exemplary snowmobile of FIG. 1.
Figure 9:
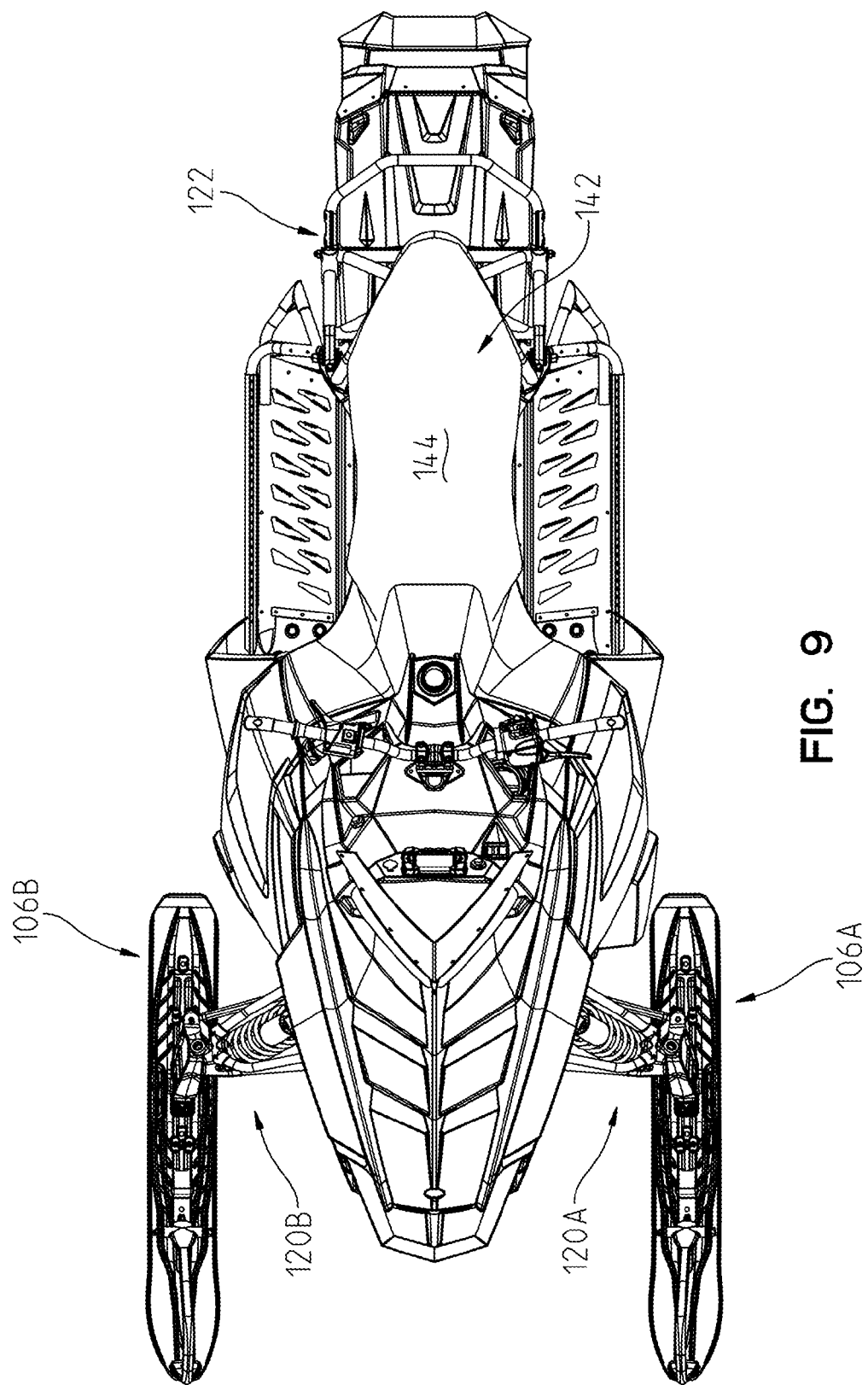
FIG. 9 illustrates a top view of the exemplary snowmobile of FIG. 1.

As shown generally in FIGS. 3, 6, and 7, rear frame portion 116 includes a generally U-shaped tunnel 132 which covers a front portion 133 of endless track assembly 104. A rear portion 134 of endless track assembly 104 extends beyond the rear of tunnel 132. The rear of tunnel 132 is indicated in FIG. 6 by line 136.

Returning to FIG. 10, rear portion 116 of frame 110 supports a sear bracket 140 which supports and couples a seat 142 shown in FIG. 1. In one embodiment, seat 142 is coupled to portion 147 (FIG. 11A) of seat bracket 140 through couplers, such as screws, bolts, or other fasteners. Seat 142 includes a seating surface 144 upon which the operator of vehicle 100 is supported. A rear portion of seat 142 is supported by a rear seat support bracket 146. Referring to FIG. 6, rear seat support bracket 146 is coupled to rear frame portion 116 through a mounting bracket 150.

Mounting bracket 150 also couples seat bracket 140 to rear frame portion 116 as well as a portion of rear suspension 122 to rear frame portion 116. As shown in FIG. 6, rear seat support bracket 146 is coupled to mounting bracket 150 forward of the end of tunnel 132 is indicated by line 136. Further, rear seats support bracket 146 supports seat 142 beyond the end of tunnel 132 as indicated by line 136.

Figure 11B:
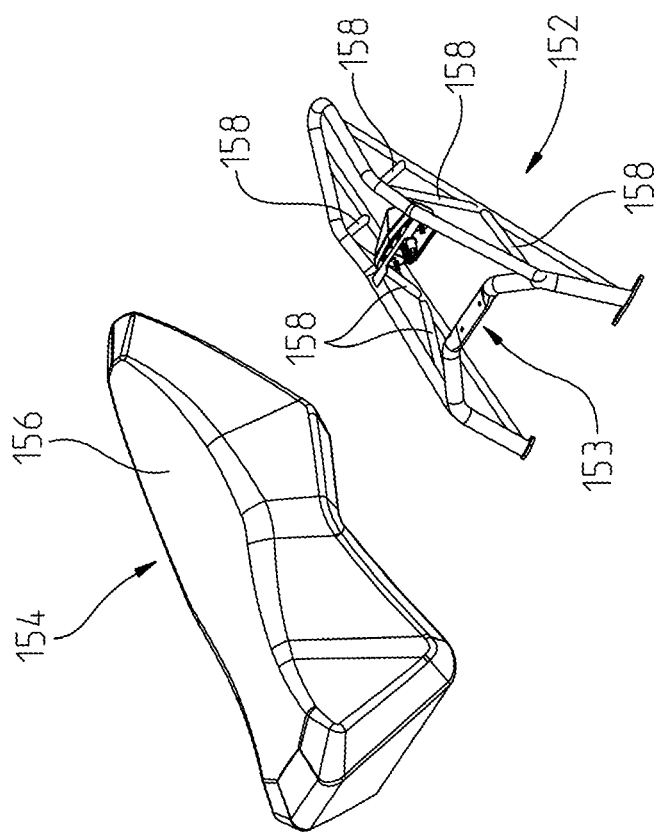
FIG. 11B illustrates another exemplary seat frame bracket and another exemplary seat cushion.
Figure 11A:
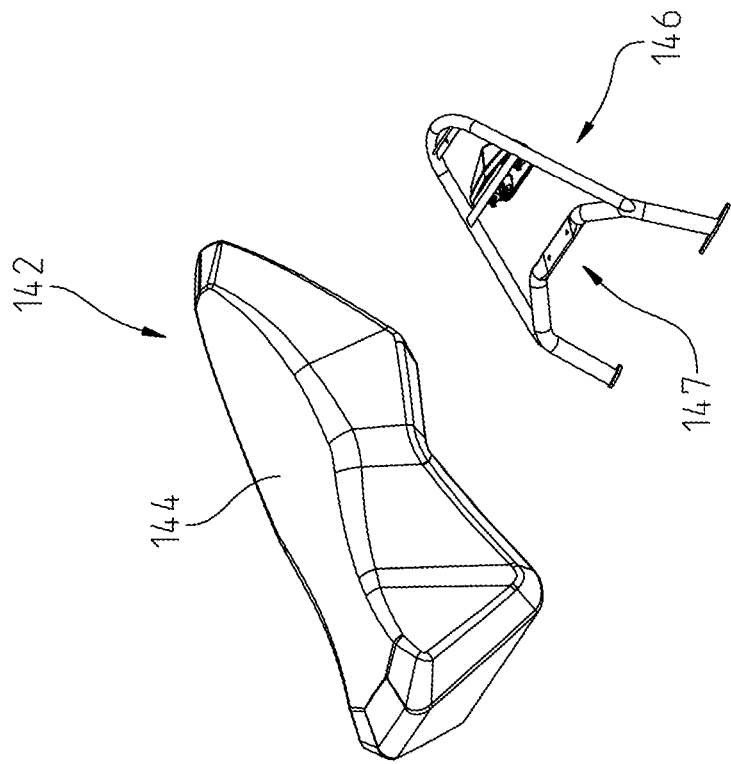
FIG. 11A illustrates an exemplary seat frame bracket and an exemplary seat cushion.

Referring to FIG. 11B, another rear seat support bracket 152 is shown which may be coupled to mounting bracket 150. Rear seat support bracket 152 is elongated relative to rear seat support bracket 146 which is shown FIG. 11A. The additional length of rear seat support bracket 152 accommodates an elongated seat 154 having a seating surface 156. Seat 154 is coupled to seat bracket 140 and portion 153 of rear seat support bracket 152. Rear seat support bracket 152 also includes a plurality of attachment bars 158 which permit the attachment of bungies or other cargo securing means to rear seat support bracket 152. In one embodiment, either rear seat support bracket 146 or rear seat support bracket 152 includes openings sized to cooperate with expansion retainers to couple cargo or cargo carrying devices to their respective rear seat support bracket 146 or rear seat support bracket 152. Additional details regarding expansion retainers and the openings to which they couple are provided in U.S. Pat. No. 7,055,454, to Whiting et al., filed Jul. 13, 2004, titled "Vehicle Expansion Retainers," the disclosure of which is expressly incorporated by reference herein.

Returning to FIG. 6, a rear bumper 164 is coupled to rear suspension 122. As shown in FIG. 6, rear suspension 122 includes an upper portion 160 which is rotatably coupled to mounting bracket 150 at a location 162. Location 162 corresponds to an axis of rotation extending out of the page of FIG. 6. Upper portion 160 is also rotatably coupled to a linear force element 170 at a location 172. Location 172 corresponds to an axis of rotation extending out of the page of FIG. 6. Rear suspension 122 further includes a lower portion 166 coupled to slide rails 168 at the location 169. Location 169 corresponds to an axis of rotation extending out of the page of FIG. 6. As known in the art slide rails 168 and idler wheels 173 are provided inside endless belt 130 and generally maintain endless belt 130 in its proper configuration and tension relative to a driveshaft. Upper portion 160 of rear suspension 122 is rotatably coupled to lower portion 166 of rear suspension 122 at a location 174. Location 174 corresponds to an axis of rotation extending out of the page of FIG. 6.

As stated herein, rear bumper 164 is coupled to rear suspension 122 and extends rearward from rear suspension 122. In the illustrated embodiment rear bumper 164 is coupled to lower portion 166 of rear suspension 122 at a location 176 which is generally between the rotatable axis 162 and the rotation axis 169. As best shown in FIG. 3, rear bumper 164 moves with lower portion 166 of rear suspension 122.

A flexible snow deflector 180 is shown in FIG. 3. Snow deflector 180 has a first portion 179 which extends from location 162 to location 174, a second portion 181 which extends from location 174 generally out past the end of rear bumper 164, and a third portion 183 which is angled down relative to second portion 181. In one embodiment, first portion 179, second portion 181, and third portion 183 are a single component. In one embodiment, one or more of first portion 179, second portion 181, and third portion 183 are separate from the remainder of first portion 179, second portion 181, and third portion 183.

Snow deflector 180 may be coupled to locations 162 and 174 (FIG. 6) in any suitable manner. In one example, ties may be provided to couple snow deflector 180 to cross members extending over endless track belt 130. In another example, snow guard 180 includes clips or passageways which receive a portion of the cross members extending over endless track belt 130. Second portion 181 of snow deflector 180 may be coupled to rear bumper 164 through ties to keep snow deflector 180 spaced apart from endless belt 130.

Flexible snow deflector 180 is generally coupled to frame 110 at the rear of tunnel 132 and is coupled to upper portion 165 of rear bumper 164. In one embodiment, snow deflector 180 is a flexible snow flap. Snow deflector 180 moves with rear bumper 164 as rear suspension 122 is compressed or extended during the operation of vehicle 100.

Figure 13:
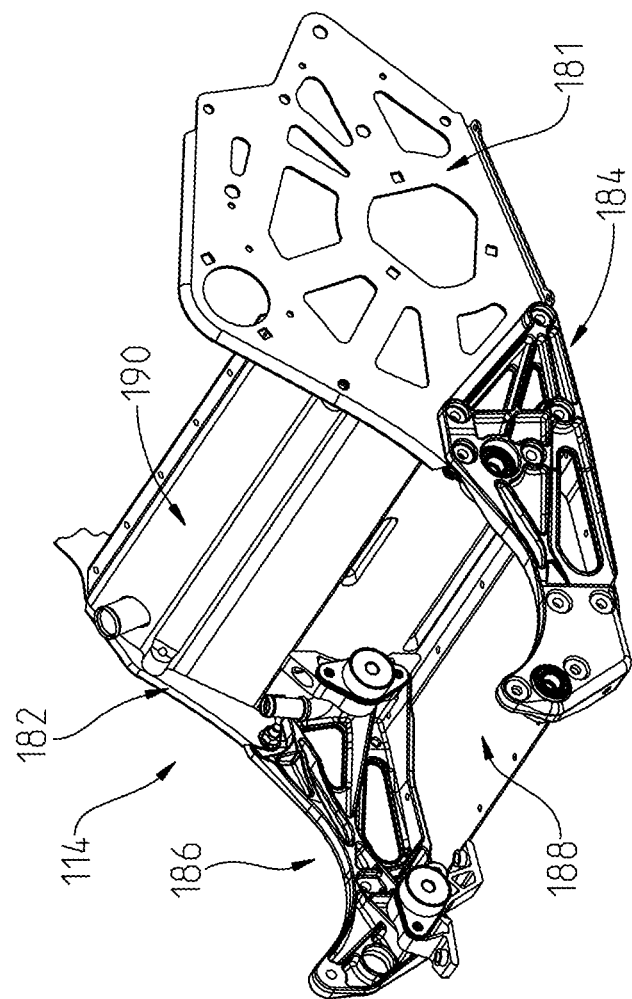
FIG. 13 illustrates a portion of the frame of FIG. 10 including a left front clip casting, a left side casting, a right side casting, a floor portion extending therebetween, a left side bulkhead, and a right side bulkhead, and a tunnel front member which also provides a cooler unit for the cooling system of the exemplary snowmobile of FIG. 1.

Referring to FIG. 13, mid-frame portion 114 of frame 110 includes a bulkhead member 181 and a bulkhead head member 182 which are coupled to tunnel 132 (FIG. 10) on the left side and the right side of vehicle 100, respectively. Middle frame portion 114 further includes a left side bulkhead member 184 and right side bulkhead member 186. Bulkhead members 184 and 186 are coupled to respective bulkhead members 181 and 182. In one embodiment, bulkhead members 184 and 186 are cast components. As explained herein, these cast components include mounting locations for other frame members and components of vehicle 100. Mid-frame portion 114 of frame 110 further includes a floor member 188 which is coupled to and extends between cast members 184 and 186. Floor member 188 is coupled along its rearward edge to a front cooler unit 190.

Figure 16:
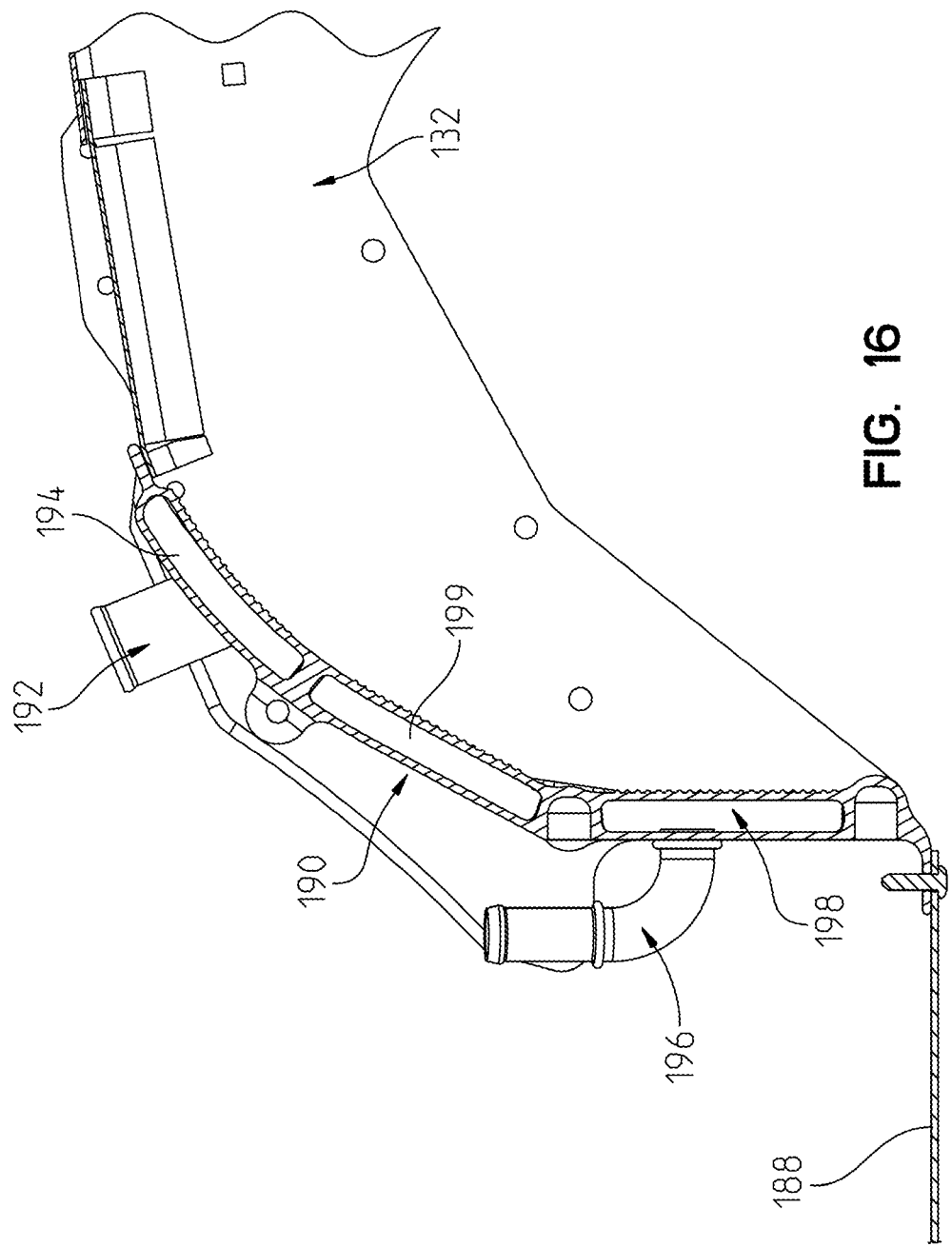
FIG. 16 illustrates a sectional view of a center cooler of the cooling system of FIG. 32.
Figure 17:
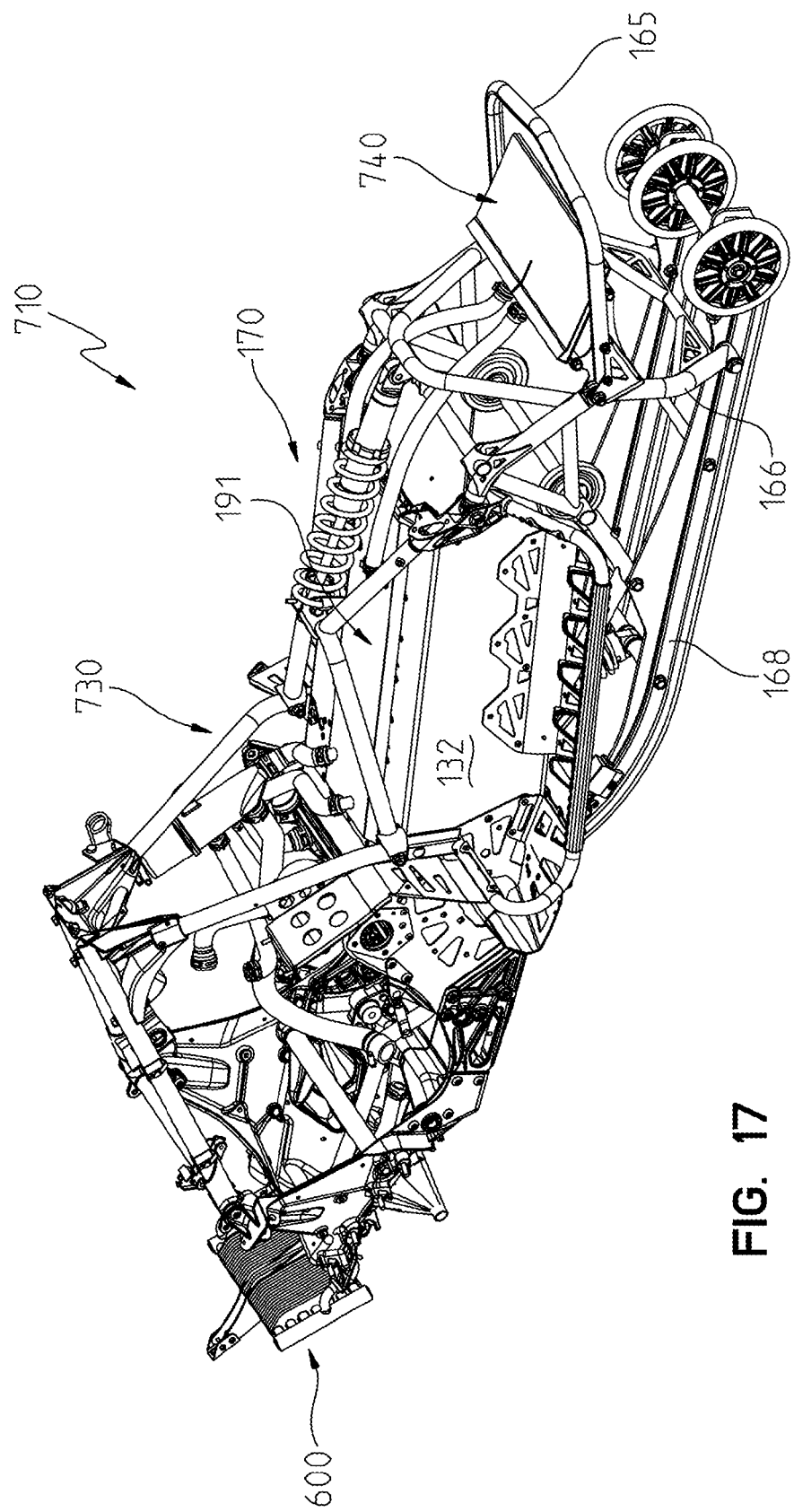
FIG. 17 illustrates an alternate snowmobile frame and cooling system.

Referring to FIG. 16, front cooler unit 190 serves as a structural component of frame 110. Front cooler 190 provides a front portion of tunnel 132. Front cooler 190 includes a first fluid conduit 192 which is in fluid communication with a fluid conduit 194 internal to front cooler 190. Front cooler 190 further includes a second fluid conduit 196 which is in fluid communication with a second internal fluid conduit 198 of front cooler 190. Front cooler 190 further includes a third internal fluid conduit 199. Fluid flows through front cooler 190 from one of first fluid conduit 192 and second fluid conduit 196 to the other of first fluid conduit 192 and second fluid conduit 196 by way of fluid conduits 194, 198, and 199.

Figure 15:
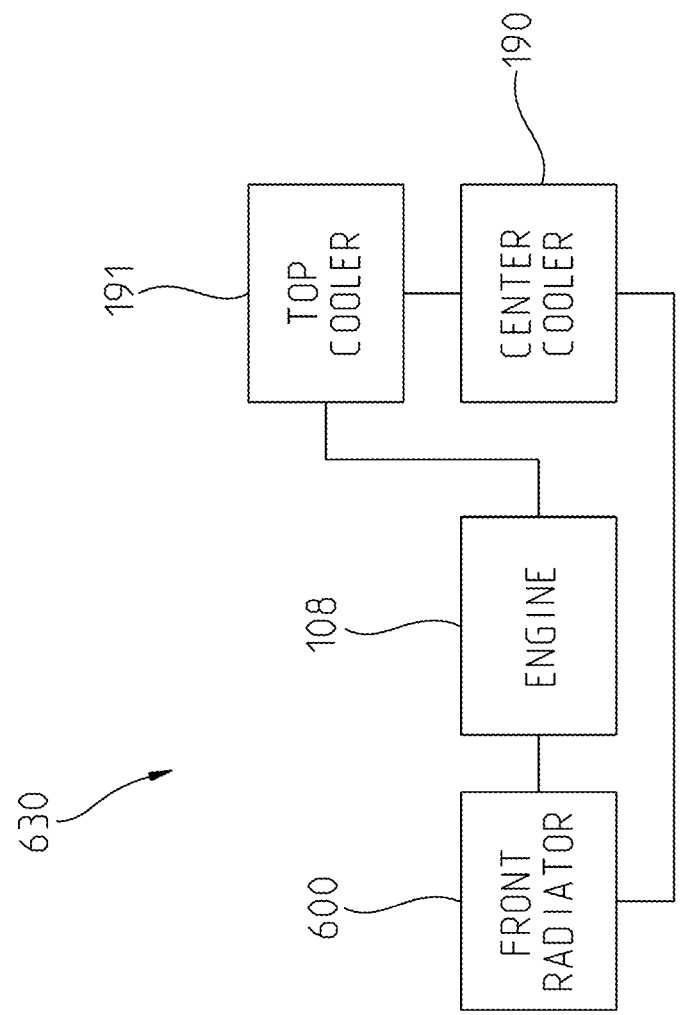
FIG. 15 illustrates a representation of a cooling system for the power source of the exemplary snowmobile of FIG. 1.

In one embodiment, front cooler 190 is a part of a cooling system 630 of vehicle 100, represented in FIG. 15. Cooling system 630 may include a front radiator 600, front tunnel cooler 190, and a top tunnel cooler 191. Warmed cooling fluid from engine 108 is circulated through front radiator 600, front tunnel cooler 190, and a top tunnel cooler 191 to be cooled and then is provided back to engine 108. Front tunnel cooler 190 and top tunnel cooler 191 mainly cool the fluid due to snow present in tunnel 132 during operation. However, sometimes the amount of snow brought into contact with front cooler 190 and top cooler 191 is not sufficient to cool the fluid. Front radiator 600 cools the fluid due to air passing therethrough. As such, front radiator 600 and the coolers 190 and 191 combine to cool the fluid in most riding environments. Exemplary front radiators are discussed herein.

Figure 14:
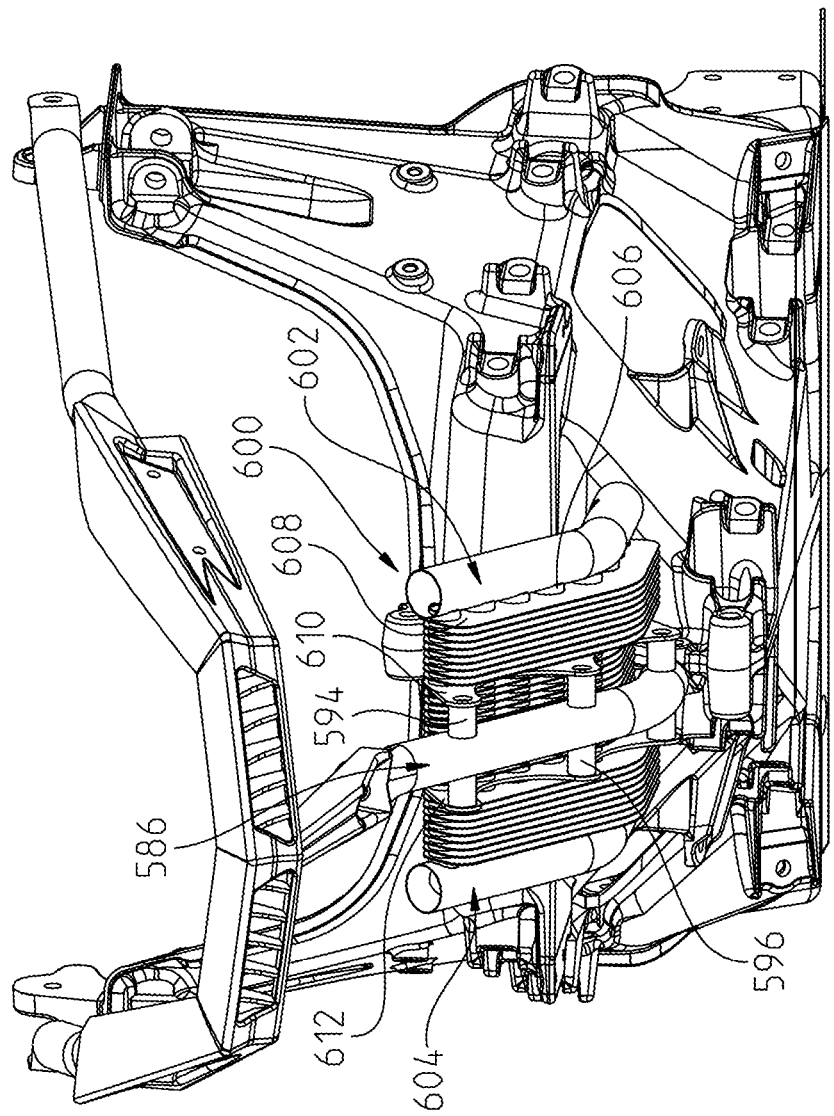
FIG. 14 illustrates the front bumper of FIG. 1 coupled to the front clip of the exemplary snowmobile.

Referring to FIG. 14 lower member 586 of front bumper 560 includes two attachment members 594 and 596. A radiator 600 is attached to lower portion 586 through attachment members 594 and 596.

Radiator 600 includes a fluid inlet tube 602 and a fluid outlet tube 604 which are in communication through a plurality of cross-tubes 606. One end of each of fluid inlet tube 602 and fluid outlet tube 604 is capped and the other end is in fluid communication with a fluid conduit connecting the respective fluid inlet tube 602 and the fluid outlet tube 604 to various components of cooling system 630.

Figure 12:
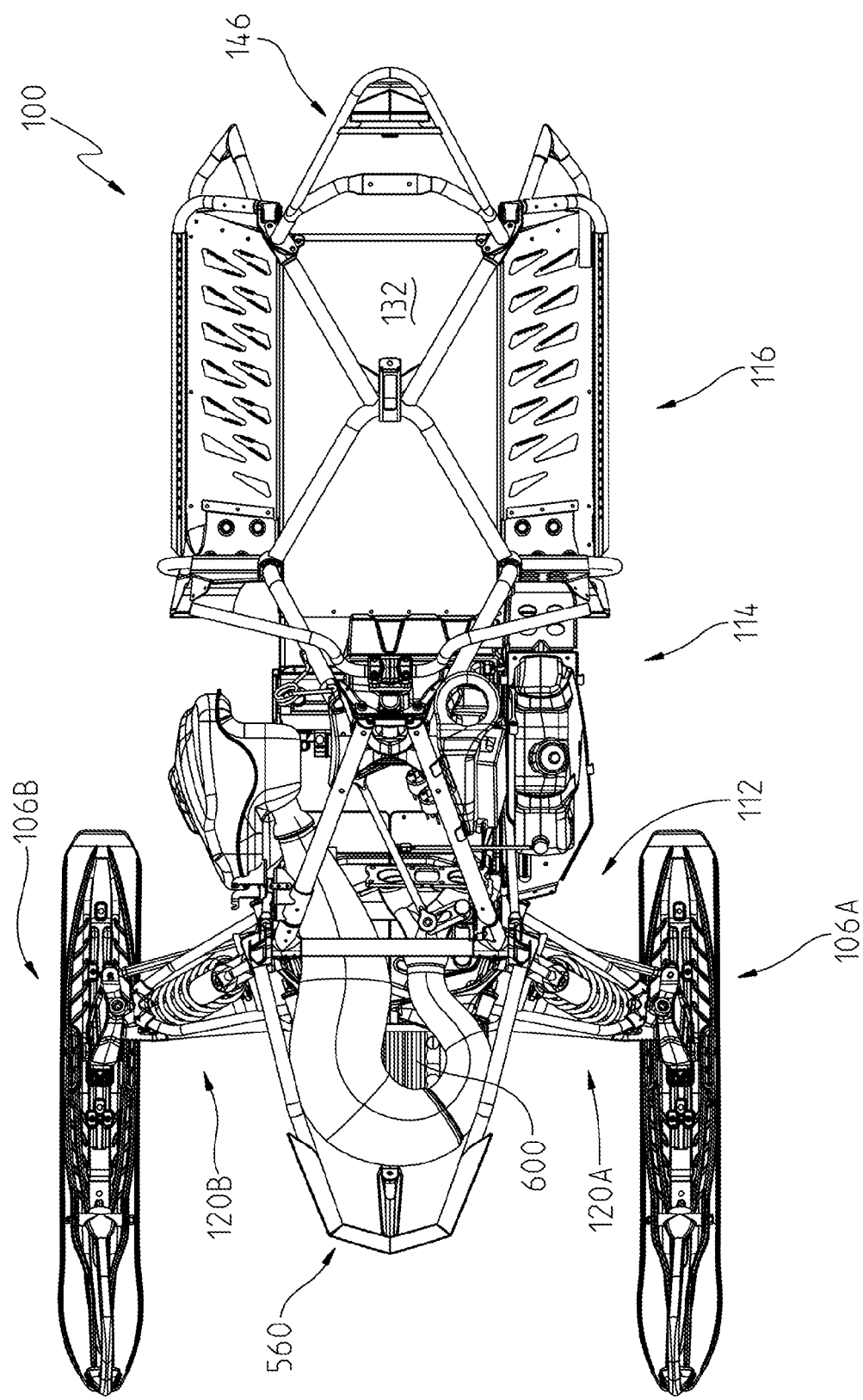
FIG. 12 illustrates a top view of the assembly of FIG. 10.

A plurality of fin members 608 are pressed onto the cross tubes 606 and are spaced apart to allow air flow there between. The fin members 608 act to cool the fluid passing through cross members 606 as it travels from fluid conduit 602 to fluid conduit 604. Two of the fin members illustratively 610 and 612 include extensions having openings therein. These extensions are coupled to attachment members 594 and 596 through mechanical couplers, such as bolts. Referring to FIG. 12 the location of radiator 600 is forward of front suspension 120a and 120b. Further, radiator 600 is forward of cast clip members 200 and 202.

Figure 20:
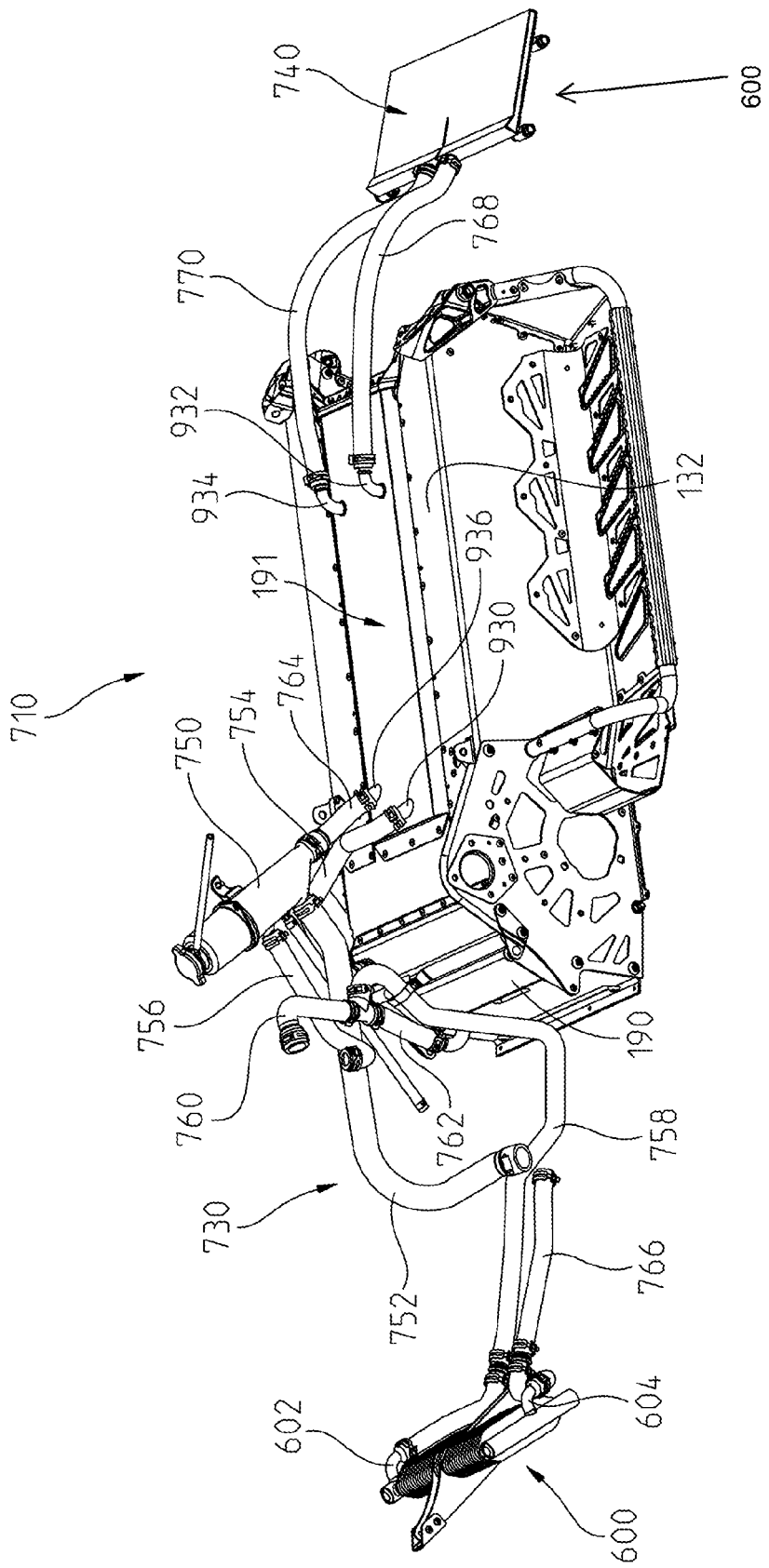
FIG. 20 illustrates a left-hand perspective view of the major elements of the cooling system.
Figure 21:
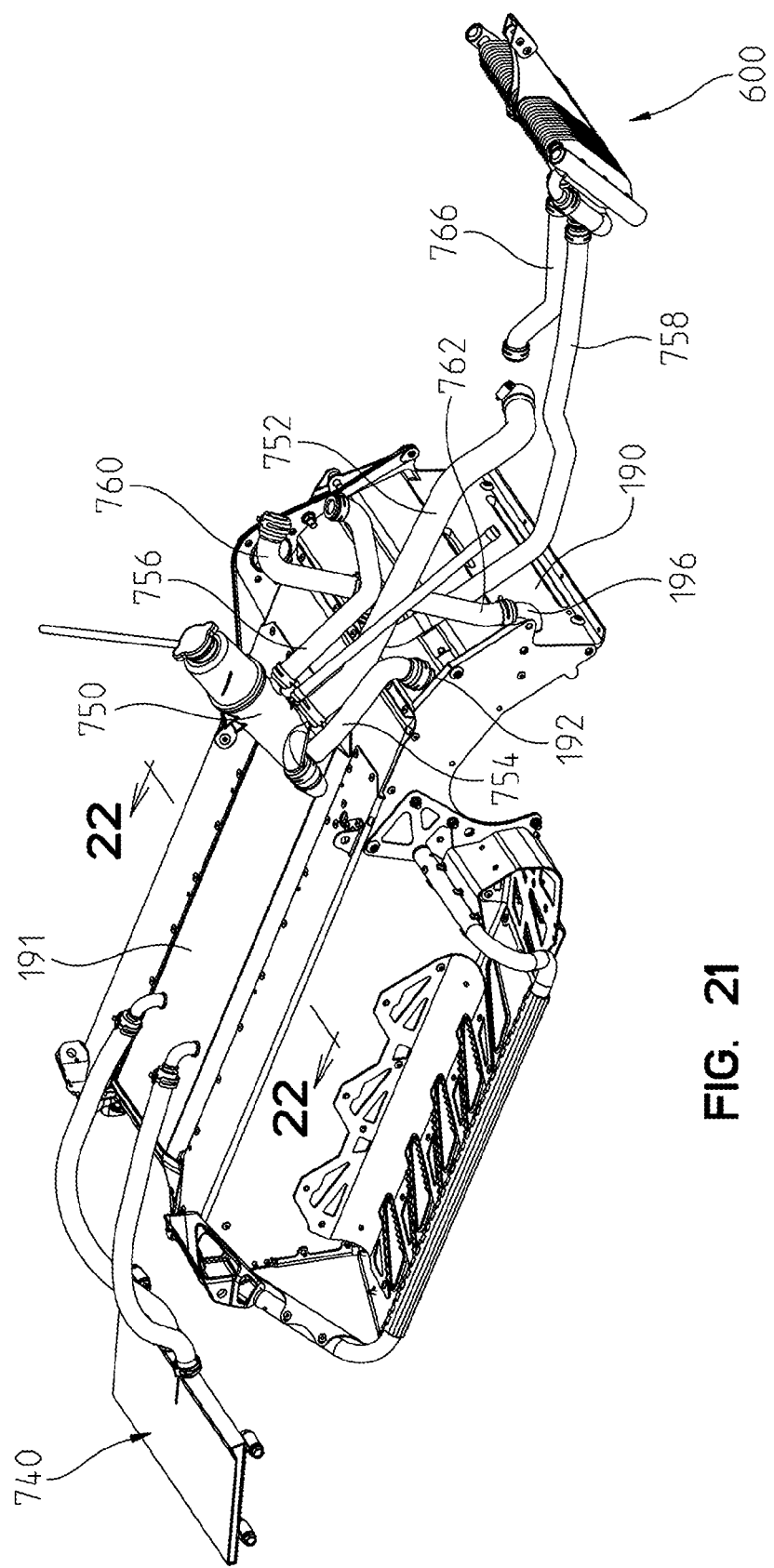
FIG. 21 illustrates a right-hand perspective view similar to that of FIG. 20.

With respect now to FIGS. 17-28, an alternate frame 710 is shown having an alternate cooling system shown at 730. Frame 710 is substantially similar to frame 110 with the exceptions that are illustrated herein. With reference to FIGS. 17-21, cooling system 730 is comprised of center cooler 190 (described above in relation to FIG. 16), top cooler 191, front radiator 600 and rear cooler 740. With reference now to FIGS. 20 and 21, the cooling system is includes a plurality of hoses which interconnect with the engine 108. More particularly, radiator 600 is interconnected by way of hoses 758 and 766. Front cooler 190 is interconnected by hoses 762 and 754 (FIG. 21). The opposite end of hose 754 is interconnected to top cooler 191. Hoses 768 and 770 interconnect rear cooler 740 while hose 764 interconnects top cooler 191 with accumulator bottle 750. Accumulator bottle 750 is interconnected to hoses 756 and 752. The fluid flow through the cooling system is described in more detail below.

Figure 22:
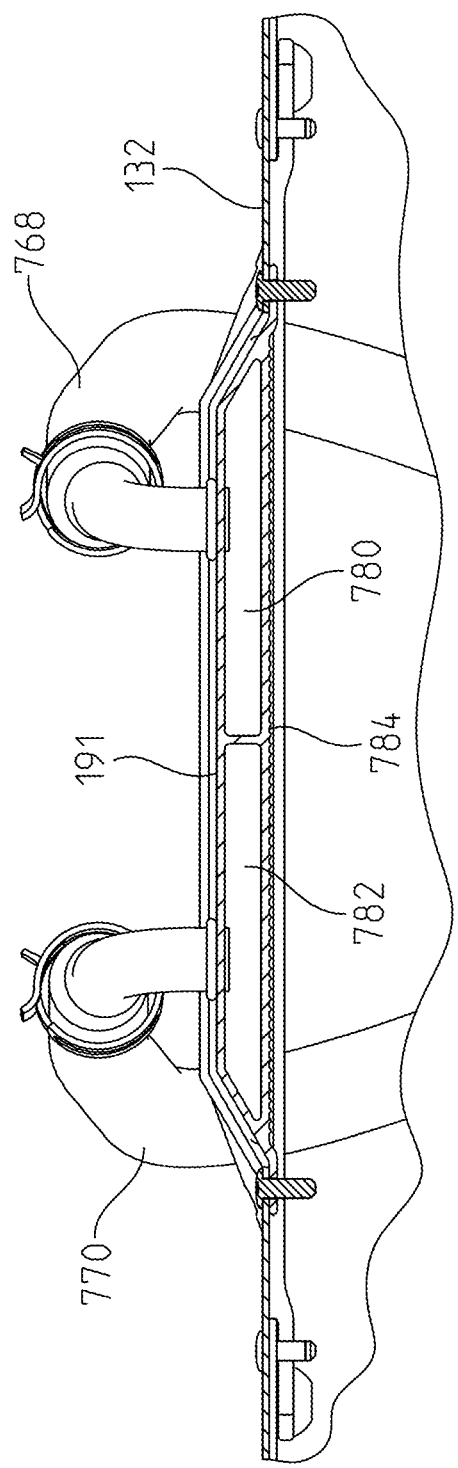
FIG. 22 illustrates a cross-sectional view through lines 22-22 of FIG. 21.

With reference now to FIG. 22, top tunnel cooler 191 is shown in section view as comprised of two separate channels, a rearwardly flowing channel 780 and a forwardly flowing channel 782. Top cooler 191 further includes a plurality of small fins 784 on the lower side of cooler 191 positioned adjacent to endless belt 130. As best shown in FIGS. 20 and 22, fluid couplings 930, 932 are connected to channel 780, while couplings 934, 936 are connected to channel 782.

Figure 23:
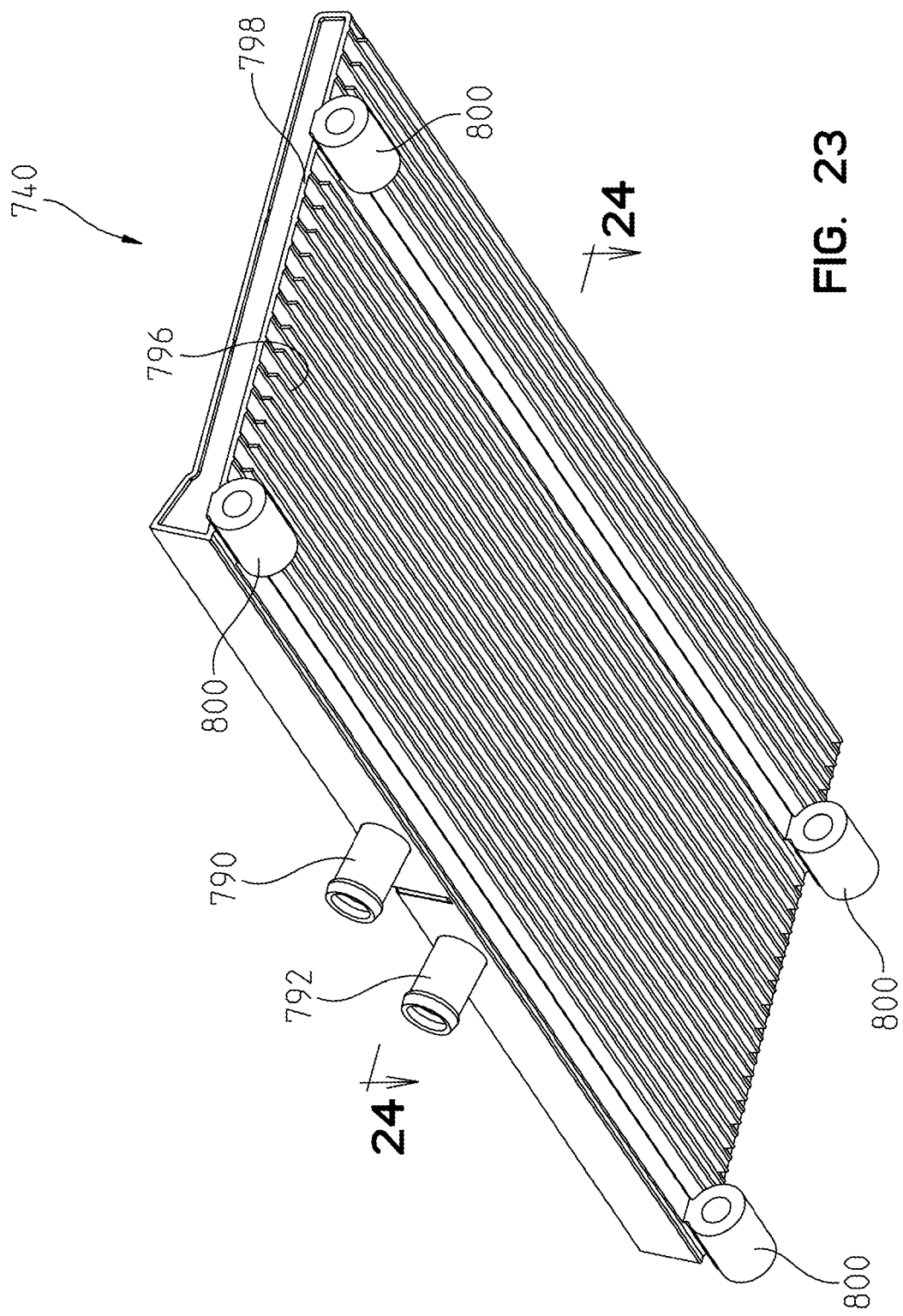
FIG. 23 illustrates an underside perspective view of the rear cooler.
Figure 24:
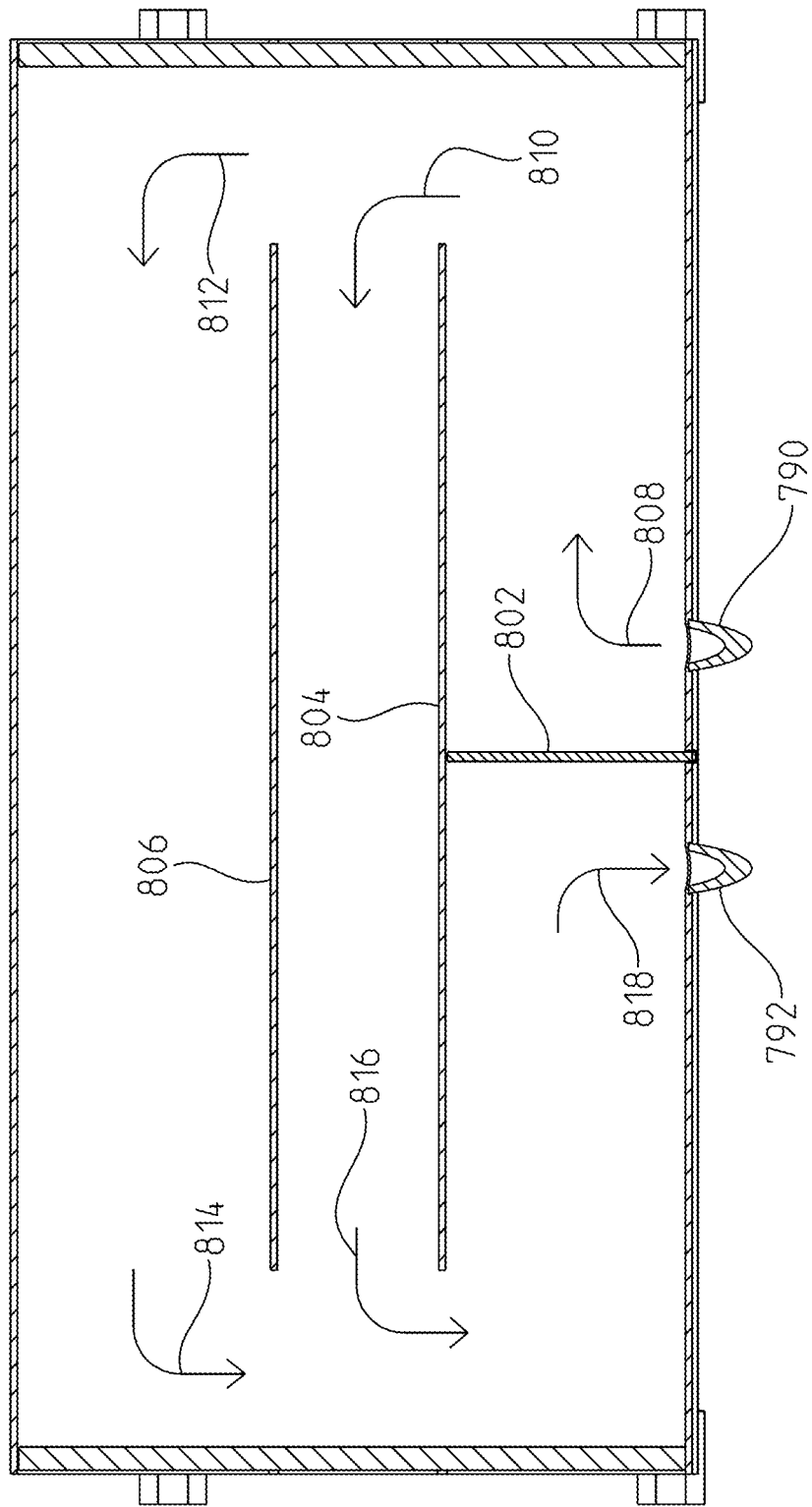
FIG. 24 illustrates a cross-sectional view through lines 24-24 of FIG. 23.

With reference now to FIG. 23, rear cooler 740 is shown having an inlet coupling 790 and an outlet coupling 792. A plurality of fins 796 are positioned on a lower surface 798 and mounting lugs 800 are used for mounting rear cooler 740 as described herein. As shown in FIG. 24, a longitudinally extending front separator wall is positioned at 802, and lateral separator walls are positioned at 804 and 806. Thus, cooling water flows into inlet outlet 790 and first follows the pattern shown by arrow 808, and may flow around wall 804 either between walls 804 and 806 as shown by arrow 810 or may continue to flow beyond wall 806 according to the flow of arrow 812. Upon return, water will flow according to arrows 814, 816 and exit through outlet coupling 792 along a path such as arrow 818.

Figure 18:
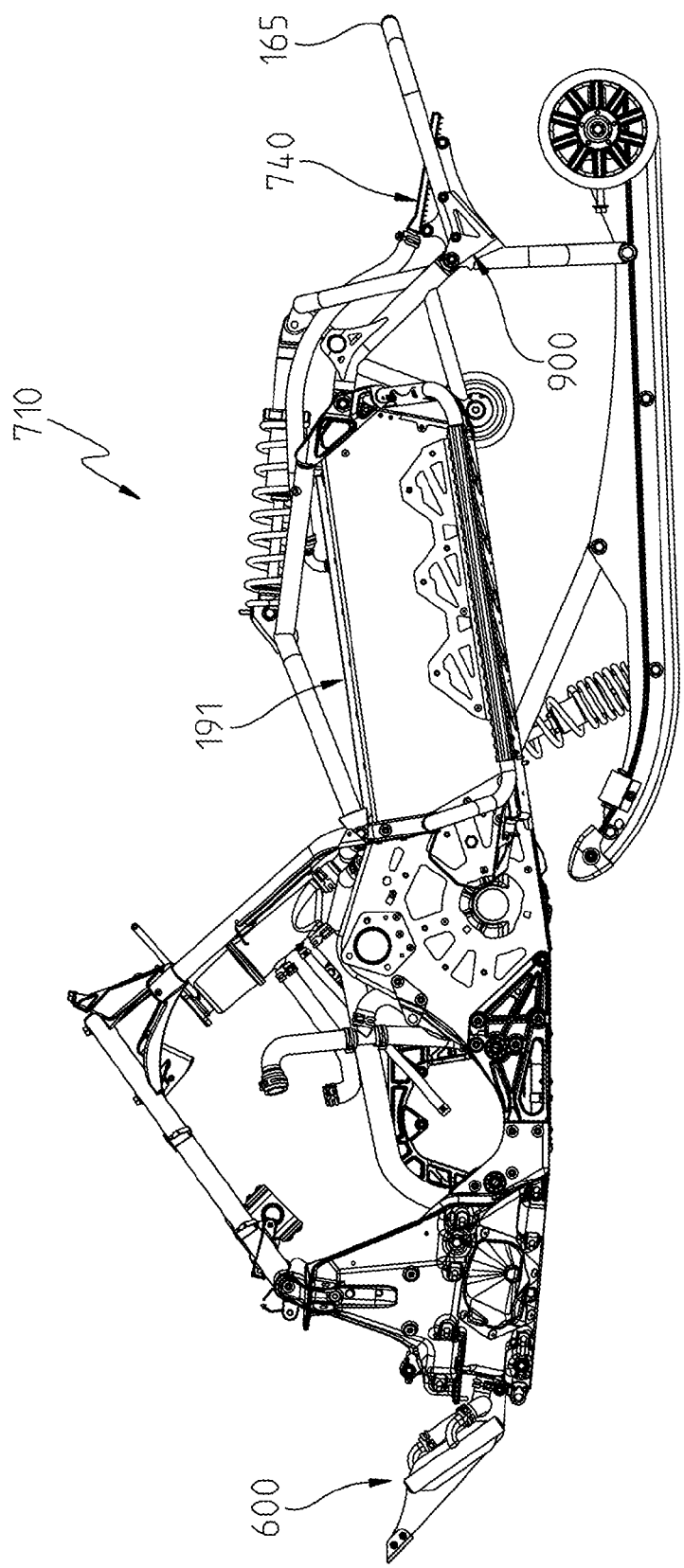
FIG. 18 illustrates a side view of the frame shown in FIG. 17.
Figure 19:
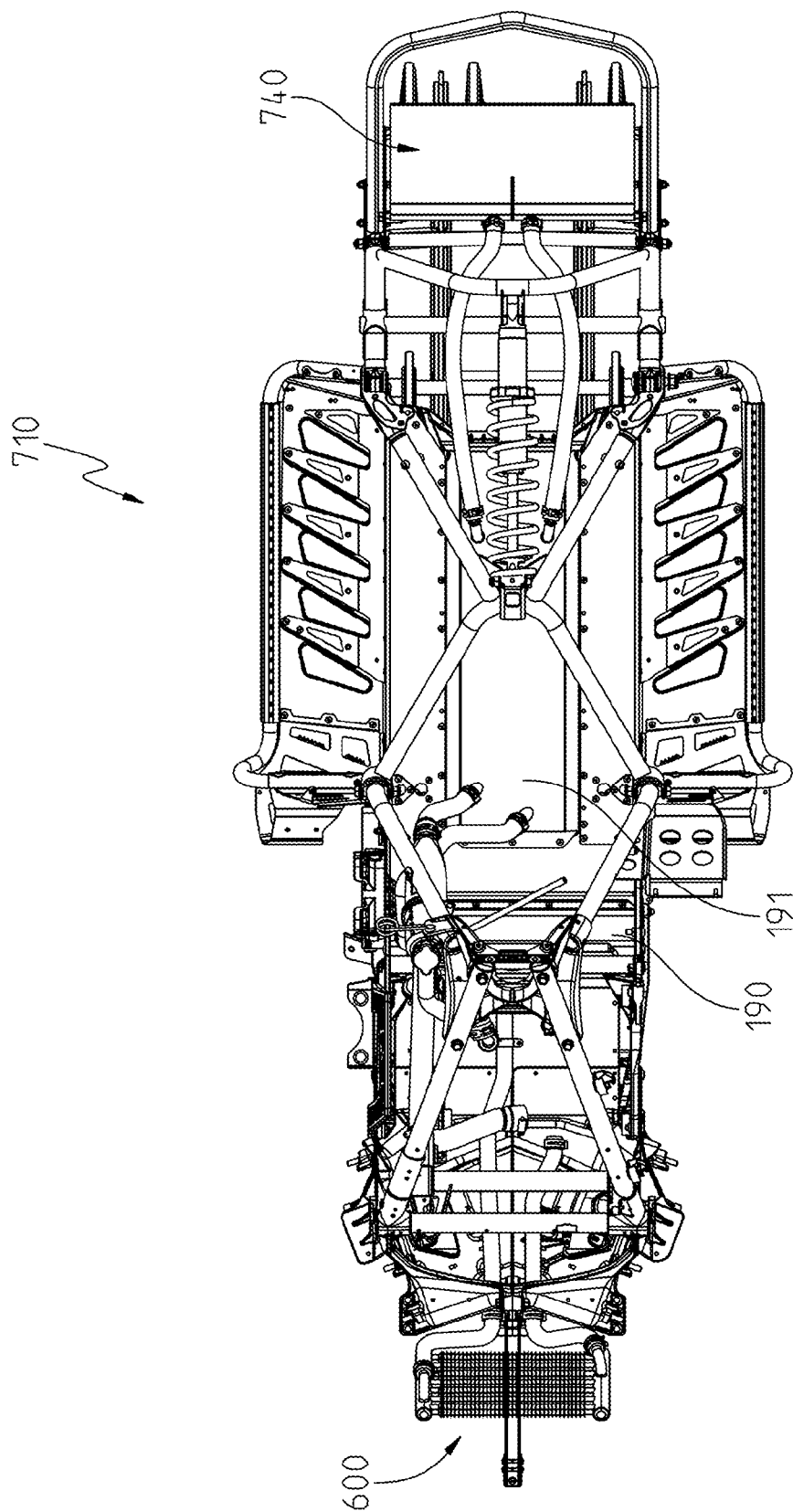
FIG. 19 illustrates a top plan view of the frame of FIGS. 17 and 18.
Figure 25:
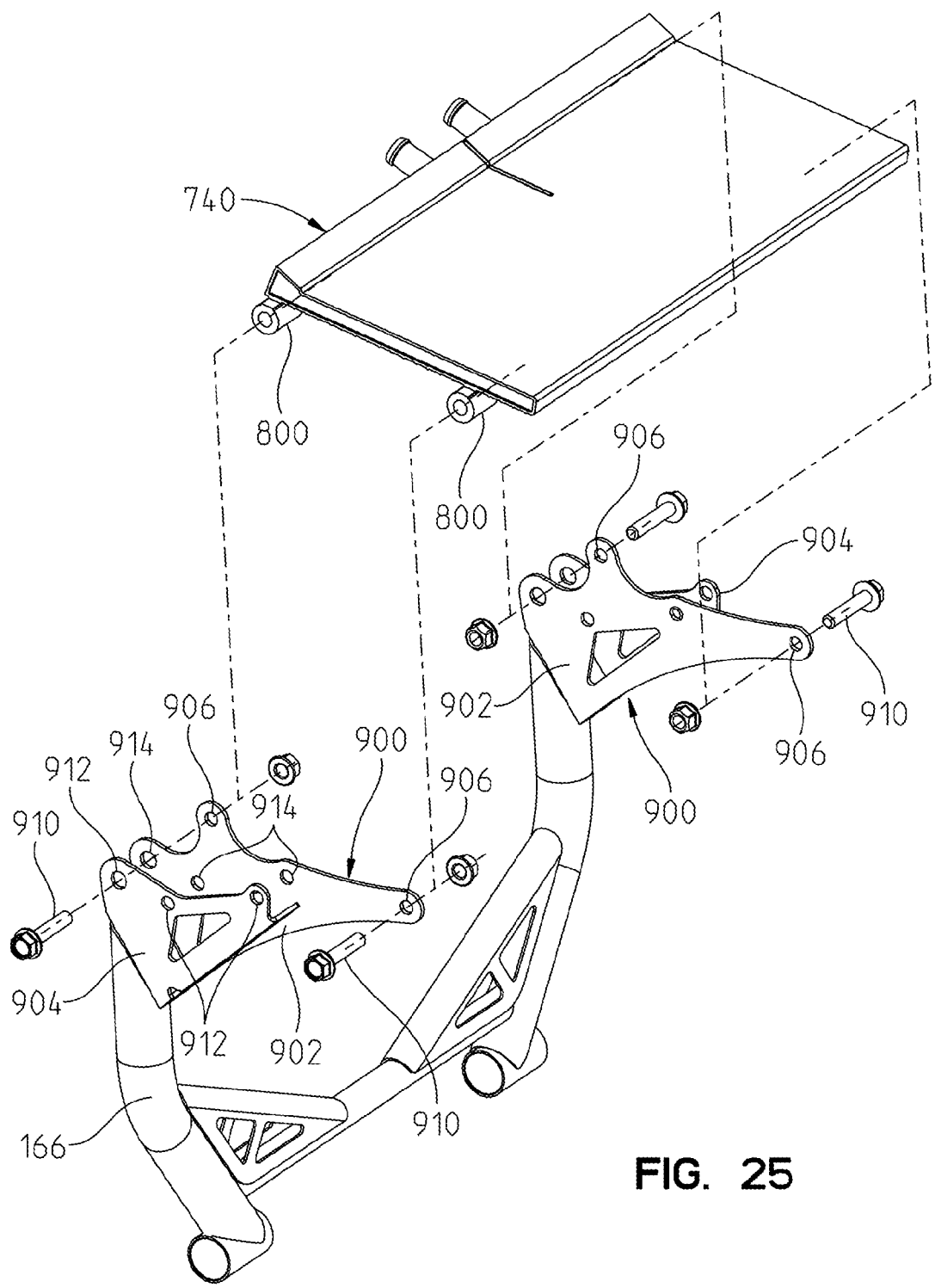
FIG. 25 illustrates an exploded view of the rear cooler and the associated mounting hardware.

With reference now to FIGS. 18 and 25, a bracket assembly 900 is fixedly attached to an end of suspension lower portion 166 and includes opposed plates 902, 904. Plate 902 includes apertures 906 for attachment to bosses 800 on rear cooler 740 by way of fasteners 910. Plate 904 also includes apertures 912 which are opposed to apertures 914 in plate 902 and mount rear bumper portion 165 (FIG. 18) thereto.

Figure 26:
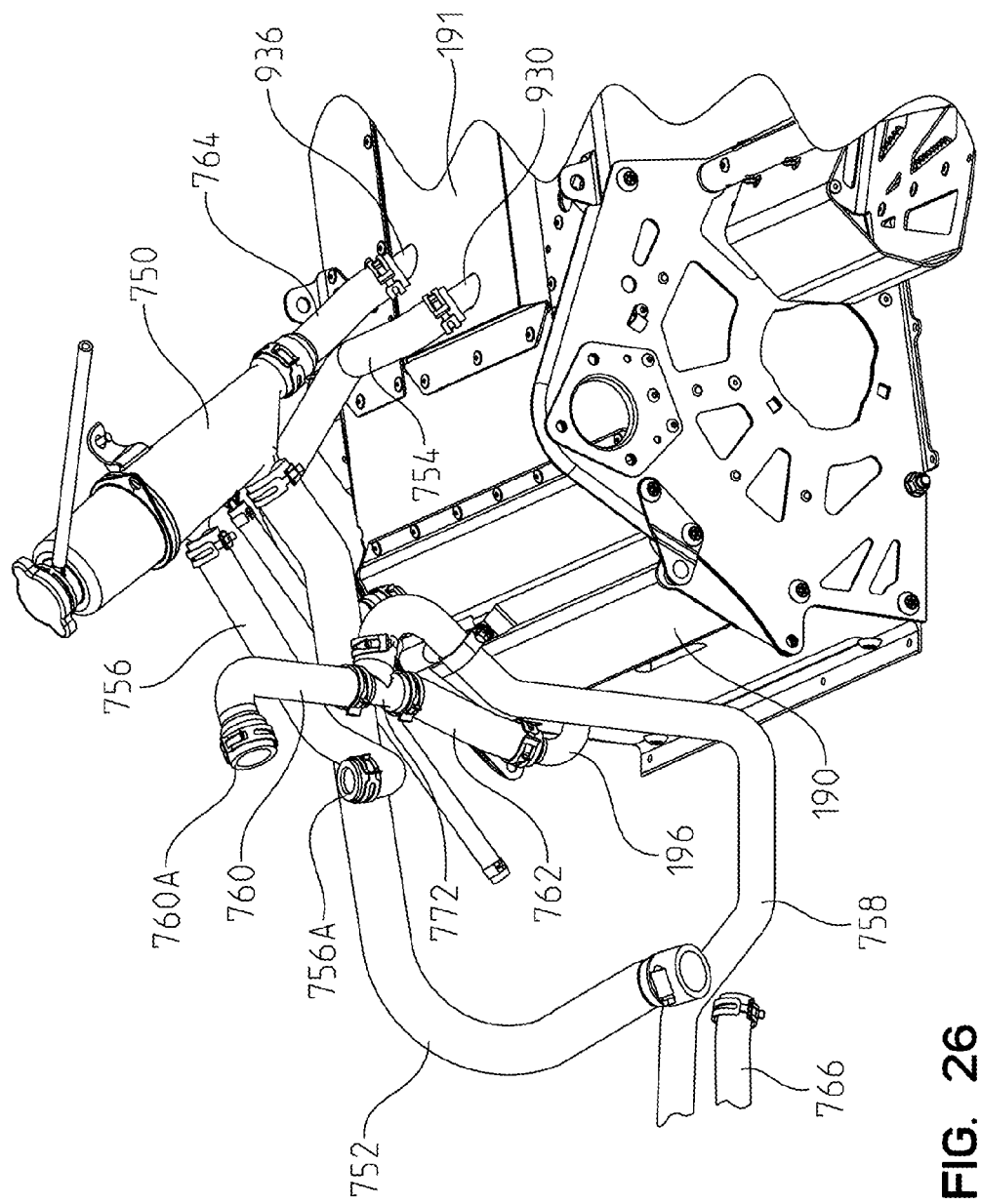
FIG. 26 illustrates an enlarged portion of the cooling system depicted in FIG. 20.
Figure 27:
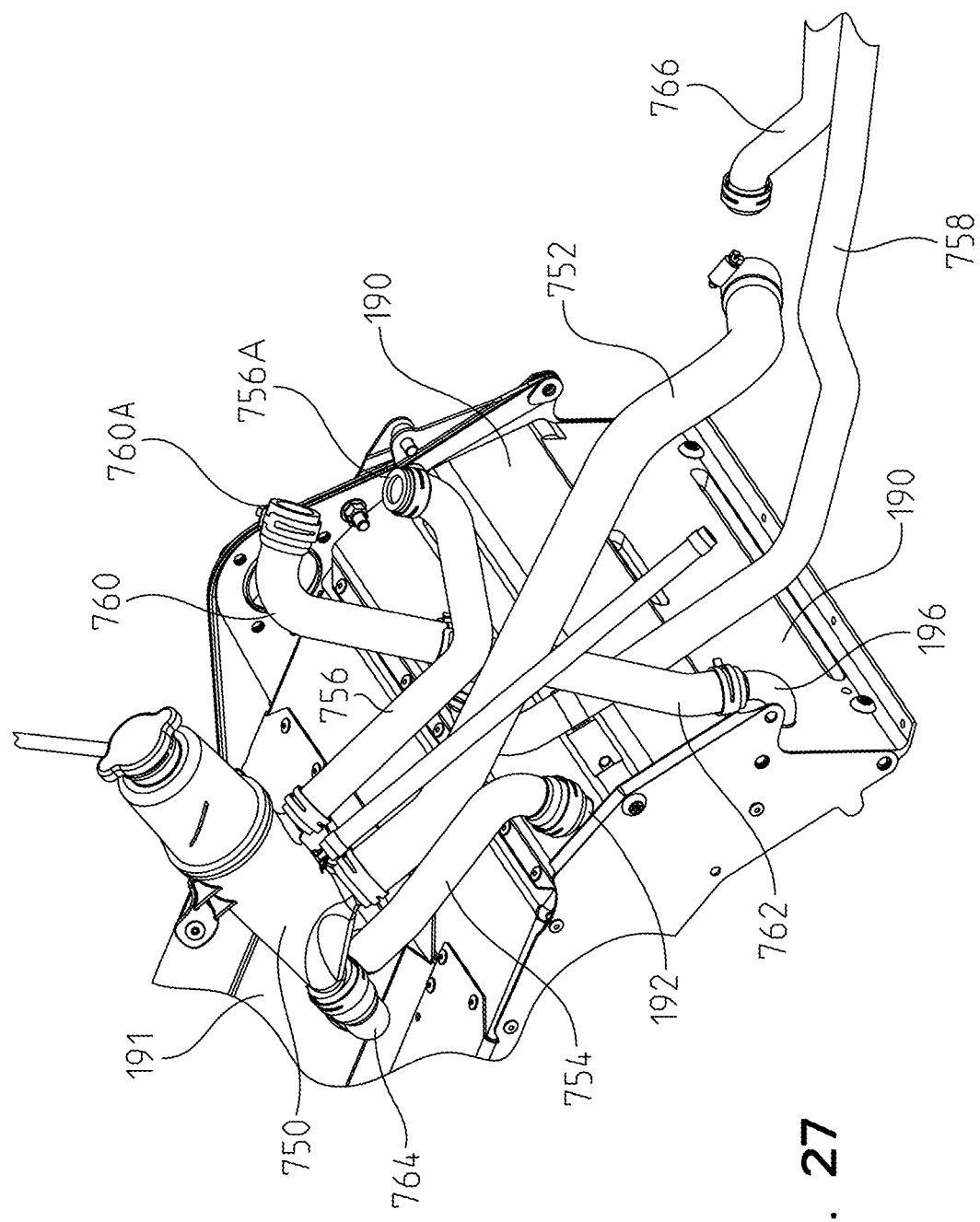
FIG. 27 illustrates an enlarged portion of the cooling system depicted in FIG. 21.
Figure 28:
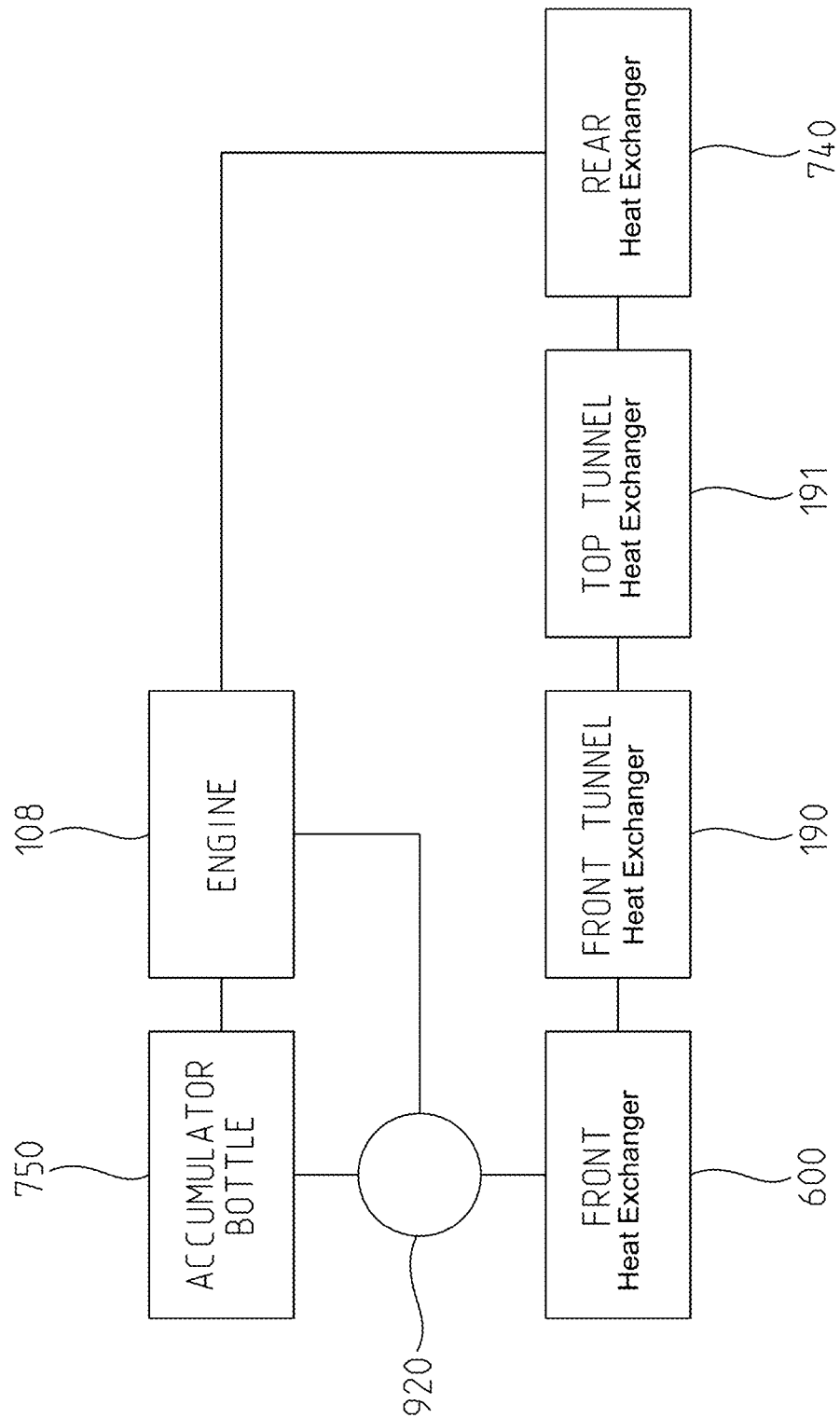
FIG. 28 is a diagrammatical view of the alternate cooling system.

With reference now to FIGS. 26-28, the operation of the cooling system 730 will be described in greater detail. As shown in FIG. 28, a thermostat 920 is positioned intermediate the engine and the cooling system, which would correspond to the position between hose end 760A and hose end 756A. That is, the thermostat is positioned in a T-connection and located at an exit water jacket of the engine, where the water jacket is connected to hose end 760A and hose end 756A. If the cooling water is not yet at a temperature to open the thermostat (approximately 130° F.), hose end 760A is effectively closed by the thermostat. This simply causes recirculation of the water through hose end 756A to the accumulator bottle 750 back to the engine by way of hose 752 through a small closed loop, without proceeding through any of the coolers 600, 190, 191 or 740.

Once the thermostat opens, hose end 756A is effectively closed and the heated water enters through hose end 760A. Water enters through hose 760, and continues to the T-fitting 772 whereupon water flows into hose 758 and hose 762. The water in hose 758 flows into front radiator 600 and returns to the engine 108 by way of hose 766. The water which enters hose 762 goes into front tunnel cooler 190 (through conduit 196) and exits by way of hose 754 (through conduit 192, FIG. 27). The water from hose 754 goes into inlet 930 (FIG. 26) and through passageway 780 (FIG. 22) of top tunnel cooler 191, towards the rear of the snowmobile. The cooling water exits tunnel cooler 191 by way of hose 768 (FIG. 20) to rear cooler 740 and then back to tunnel cooler 191 through hose 770. The cooling water flows through channel 782 (FIG. 22) and back to the accumulator bottle 750 through hose 764.

It should be appreciated that the water continuously cycles as described above. Furthermore, it should be appreciated that the thermostat may be partially opened, such that the actual water flow is a combination flow pattern, that is partially a closed loop, and partially through the entire circuit of coolers 600, 190, 191 or 740.

Figure 29:
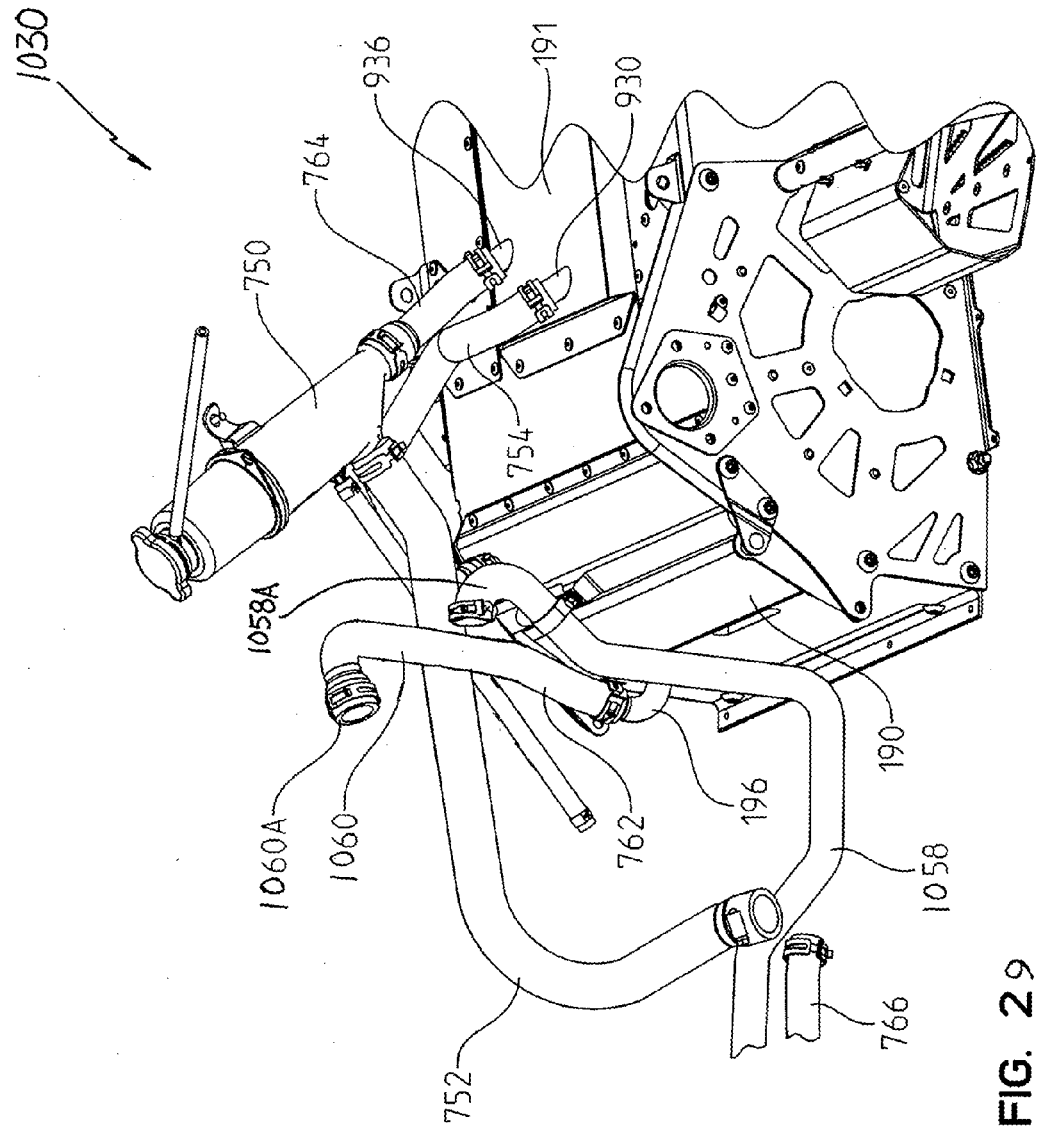
FIG. 29 shows a cooling system of greater cooling capacity for larger engines.

With reference now to FIG. 29, the operation of the cooling system 1030 will be described in greater detail. In this embodiment, a thermostat is positioned intermediate the engine and the cooling system, which would correspond to the position at hose end 1060A. It should be noticed that T-fitting 722 and hose 756 have been removed. Hose end 1058A is directly connected to the engine (rather than hose 756). If the cooling water is not yet at a temperature to open the thermostat (approximately 130° F.), hose end 1060A is effectively closed by the thermostat. This simply causes recirculation of the water through hose end 1058A to the front cooler 600 only, without proceeding through any of the coolers 190, 191 or 740, and return to the engine via hose 766.

Once the thermostat opens, the heated water enters through hose end 1060A and continues to the front tunnel cooler 190 (through conduit 196) and exits by way of hose 754 (through conduit 192, FIG. 27). The water from hose 754 goes to rear cooler 740 and then back to tunnel cooler 191 in the same method as described above.

Thus, in the cooling system 1030 of FIG. 29, engine cooling water is always re-circulated through the front radiator, and through all of the heat exchangers 190, 191, 600 and 740 once the thermostat opens.

It should be appreciated that the water continuously cycles as described above. Furthermore, it should be appreciated that the thermostat may be partially opened, such that the actual water flow is a combination flow pattern, that is partially a closed loop through radiator 600, and partially through the entire circuit of coolers 190, 191 and 740.

It should also be appreciated that the rear cooler 740 moves with the rear suspension, through the typical snowmobile jounce cycles, as it is fixedly attached directly to the suspension lower portion 166. The hoses for use in the system, particularly hoses 768 and 770 are flexible hoses, and may be standard rubber automotive style hoses.

While this invention has been described as having an exemplary design, the present invention may be further modified within the spirit and scope of this disclosure. Further, this application is intended to cover such departures from the present disclosure as come within known or customary practice in the art to which this invention pertains.

What is claimed is:

1. A snowmobile, comprising:
a frame;
a water cooled engine supported by the frame;
a ground engaging drive system for propelling the snowmobile;
a rear suspension coupling the ground engaging drive system to the frame, the rear heat exchanger being movable with the rear suspension, and
a rear heat exchanger coupled to the engine for cooling engine water, the rear heat exchanger being movable relative to the frame, and fluidly coupled by flexible couplings.

2. The snowmobile of claim 1, wherein the rear suspension is comprised of a suspension lower portion coupled to slide rails of the frame, the rear heat exchanger being attached to the suspension lower portion.

3. The snowmobile of claim 1, wherein the frame comprises a tunnel positioned above the ground engaging drive system, and intermediate the engine and the rear heat exchanger, the tunnel including a top tunnel heat exchanger having at least one channel for delivering coolant to the rear heat exchanger, and at least one channel for delivering coolant from the rear heat exchanger to the top tunnel heat exchanger.

4. The snowmobile of claim 3, wherein the rear heat exchanger is coupled to the top tunnel heat exchanger by way of flexible hoses.

5. The snowmobile of claim 3, further comprising a front tunnel heat exchanger where the front tunnel heat exchanger, the top tunnel heat exchanger and rear heat exchanger being coupled in series.

6. The snowmobile of claim 5, further comprising a front heat exchanger coupled to the engine.

7. The snowmobile of claim 6, further comprising a thermostat, wherein when the coolant is below a thermostat activation temperature, the cooling water circulates in a closed loop without circulating through any of the heat exchangers, and when the coolant is above a thermostat activation temperature, the cooling water circulates through all of the heat exchangers.

8. The snowmobile of claim 6, further comprising a thermostat, wherein when the coolant is below a thermostat activation temperature, the cooling water circulates through only the front heat exchanger, and when the coolant is above a thermostat activation temperature, the cooling water circulates through all of the heat exchangers.

9. A snowmobile comprising a frame, a water cooled engine supported by the frame and a ground engaging drive system for propelling the snowmobile, the snowmobile having a rear heat exchanger supported by a rear portion of the frame and coupled to the engine for cooling engine water, a rear suspension coupling the ground engaging drive system to the frame, the rear heat exchanger being movable with the rear suspension, and further comprising a second heat exchanger coupled to the frame and fluidly coupled to the rear heat exchanger, wherein one of the rear or second heat exchangers is movable relative to the frame, and is fluidly coupled by flexible couplings.

10. The snowmobile of claim 9, wherein the second heat exchanger is a front heat exchanger coupled to the engine.

11. The snowmobile of claim 10, further comprising a thermostat, wherein when the coolant is below an activation temperature to activate the thermostat, the cooling water circulates through only the front heat exchanger.

12. The snowmobile of claim 9, further comprising a thermostat, wherein when the coolant is below an activation temperature to activate the thermostat, the cooling water circulates in a closed loop without circulating through any of the heat exchangers.

13. The snowmobile of claim 12, further comprising an accumulator bottle provided in the closed loop.

14. The snowmobile of claim 9, wherein the frame comprises a tunnel positioned above the ground engaging drive system, and intermediate the engine and the rear heat exchanger, the second heat exchanger being defined within the tunnel as a top tunnel heat exchanger having at least one channel for delivering coolant to the rear heat exchanger, and at least one channel for delivering coolant from the rear heat exchanger to the top tunnel heat exchanger.

15. The snowmobile of claim 14, further comprising a front tunnel heat exchanger where the front tunnel heat exchanger, the top tunnel heat exchanger and rear heat exchanger are fluidly coupled in series.

16. The snowmobile of claim 9, wherein the rear suspension is comprised of a suspension lower portion coupled to slide rails of the frame, and the rear heat exchanger is attached to the suspension lower portion.

17. The snowmobile of claim 16, wherein the rear heat exchanger is coupled to the top tunnel heat exchanger by way of flexible hoses.

* * * * *